US008463679B2

(12) United States Patent
Kaplan et al.

(10) Patent No.: US 8,463,679 B2
(45) Date of Patent: Jun. 11, 2013

(54) GRAPHICAL FORECASTING INTERFACE

(76) Inventors: Craig Andrew Kaplan, Aptos, CA (US); Calen Lopata, Aptos, CA (US)

( * ) Notice: Subject to any disclaimer, the term of this patent is extended or adjusted under 35 U.S.C. 154(b) by 0 days.

(21) Appl. No.: 13/243,995

(22) Filed: Sep. 23, 2011

(65) Prior Publication Data

US 2012/0188250 A1    Jul. 26, 2012

Related U.S. Application Data

(63) Continuation of application No. 11/526,218, filed on Sep. 22, 2006, now abandoned.

(60) Provisional application No. 60/719,704, filed on Sep. 22, 2005.

(51) Int. Cl.
    *G06Q 40/00*      (2012.01)

(52) U.S. Cl.
    USPC ............................................. 705/35; 705/7.11

(58) Field of Classification Search
    USPC .......................................... 705/35, 7.11–7.42
    See application file for complete search history.

(56) References Cited

U.S. PATENT DOCUMENTS

| | | | | |
|---|---|---|---|---|
| 5,297,031 A * | 3/1994 | Gutterman et al. | ............... | 705/37 |
| 5,297,032 A * | 3/1994 | Trojan et al. | ..................... | 705/37 |
| 5,465,308 A * | 11/1995 | Hutcheson et al. | ............ | 382/159 |
| 5,689,651 A * | 11/1997 | Lozman | ........................... | 705/37 |
| 5,918,217 A * | 6/1999 | Maggioncalda et al. | ... | 705/36 R |
| 5,946,666 A * | 8/1999 | Nevo et al. | .................... | 705/36 R |
| 6,272,474 B1 * | 8/2001 | Garcia | ........................ | 705/36 R |
| 6,278,982 B1 * | 8/2001 | Korhammer et al. | ........ | 705/36 R |
| 6,408,282 B1 * | 6/2002 | Buist | ........................... | 705/36 R |
| 6,694,054 B1 * | 2/2004 | Gardes et al. | ................. | 382/181 |
| 6,766,304 B2 * | 7/2004 | Kemp et al. | .................. | 705/36 R |
| 6,772,132 B1 * | 8/2004 | Kemp et al. | .................. | 705/36 R |
| 6,801,201 B2 * | 10/2004 | Escher | ........................ | 705/36 R |
| 6,907,404 B1 * | 6/2005 | Li | ................................ | 705/36 R |
| 6,938,011 B1 * | 8/2005 | Kemp et al. | ..................... | 705/37 |
| 6,963,855 B1 * | 11/2005 | Borzenko | ...................... | 705/37 |
| 7,082,398 B1 * | 7/2006 | Apple et al. | .................. | 705/7.31 |
| 7,127,424 B2 * | 10/2006 | Kemp et al. | ..................... | 705/37 |
| 7,146,336 B2 * | 12/2006 | Olsen et al. | ...................... | 705/37 |
| 7,181,423 B2 * | 2/2007 | Blanchard et al. | ......... | 705/36 R |
| 7,212,999 B2 * | 5/2007 | Friesen et al. | .................. | 705/37 |
| 7,228,289 B2 * | 6/2007 | Brumfield et al. | ............. | 705/35 |
| 7,389,268 B1 * | 6/2008 | Kemp et al. | ..................... | 705/39 |
| 7,525,545 B2 * | 4/2009 | Brauss | .......................... | 345/440 |

(Continued)

OTHER PUBLICATIONS

International Search Report of PCT Application No. PCT/US2006/036922, Aug. 19, 2008, 1 page.

(Continued)

*Primary Examiner* — Thomas Dixon
*Assistant Examiner* — Benjamin S Fields
(74) *Attorney, Agent, or Firm* — David A. Guerra

(57) ABSTRACT

A system, method, apparatus, and technique for gathering and providing information forecasts is disclosed. An example of a system according to the technique includes a graph module having at least and interactive portion and an optional static portion. The interactive portion of the graph can be capable of plotting future data points provided by a user. The static portion of the graph can contain a plot of past data points. The graphical forecasting interface provides a simple mechanism for a user to make one or a plurality of future predictions as to an information item using a graphical input.

41 Claims, 22 Drawing Sheets

U.S. PATENT DOCUMENTS

| | | | |
|---|---|---|---|
| 7,574,388 B1* | 8/2009 | Peebler | 705/35 |
| 7,599,867 B1* | 10/2009 | Monroe et al. | 705/35 |
| 7,685,042 B1* | 3/2010 | Monroe et al. | 705/35 |
| 7,693,781 B2 | 4/2010 | Asher et al. | |
| 7,711,628 B2 | 5/2010 | Davie et al. | |
| 7,882,002 B2* | 2/2011 | Monroe et al. | 705/35 |
| 8,135,639 B2* | 3/2012 | Peebler | 705/35 |
| 2002/0007331 A1* | 1/2002 | Lo et al. | 705/36 |
| 2002/0073017 A1* | 6/2002 | Robertson | 705/37 |
| 2003/0004853 A1* | 1/2003 | Ram et al. | 705/37 |
| 2003/0009402 A1* | 1/2003 | Mullen et al. | 705/35 |
| 2003/0009411 A1* | 1/2003 | Ram et al. | 705/37 |
| 2003/0069834 A1* | 4/2003 | Cutler | 705/37 |
| 2003/0139989 A1* | 7/2003 | Churquina | 705/35 |
| 2003/0144868 A1* | 7/2003 | MacIntyre et al. | 705/1 |
| 2004/0068455 A1 | 4/2004 | Jacobus et al. | |
| 2004/0111358 A1 | 6/2004 | Lange et al. | |
| 2004/0225592 A1* | 11/2004 | Churquina | 705/37 |
| 2005/0021443 A1* | 1/2005 | Beard et al. | 705/37 |
| 2005/0080710 A1* | 4/2005 | Malato et al. | 705/37 |
| 2005/0187854 A1* | 8/2005 | Cutler et al. | 705/37 |
| 2005/0228735 A1* | 10/2005 | Duquette | 705/37 |
| 2005/0283415 A1* | 12/2005 | Studnitzer et al. | 705/35 |

OTHER PUBLICATIONS

Written Opinion of PCT Application No. PCT/US2006/036922, Aug. 19, 2008, 5 pages.
Final Office Action dated Mar. 28, 2011, from co-pending U.S. Appl. No. 11/526,218, filed Sep. 22, 2006.
Non-Final Rejection dated Aug. 11, 2010 from co-pending U.S. Appl. No. 11/526,218, filed Sep. 22, 2006.
Co-pending U.S. Appl. No. 60/719,704, filed Sep. 22, 2005.

* cited by examiner

GRAPHICAL FORECASTING INTERFACE

CROSS-REFERENCE TO RELATED APPLICATIONS

This application is a continuation of and claims the benefit of priority under 35 U.S.C. 120 to U.S. patent application Ser. No. 11/526,218, filed on Sep. 22, 2006, now abandoned entitled "GRAPHICAL FORECASTING INTERFACE," which application claims the benefit of U.S. Provisional Application No. 60/719,704 filed on 22 Sep. 2005, entitled GRAPHICAL FORECASTING INTERFACE by inventors Craig Kaplan and Calen Lopata, both of which applications are incorporated herein by reference in their entirety.

FIELD OF THE INVENTION

This invention pertains generally to systems and methods for using a graphical interface for both presenting an output and receiving an input of data, and more particularly to a system and method for providing and using a graphical forecasting interface (GFI) for accepting data predictions and forecasts for a future information or event based on a user interaction with a graph and the underlying database and algorithmic elements associated with the graphical display.

BACKGROUND

Forecasting is often a difficult and cumbersome task. Typically forecasting involves substantial and complicated research. After the research is complete, the forecaster must input the forecasts into a machine one by one. The input of a large amount of forecast data is tedious and wastes valuable time and resources.

Generally, a forecasting system requires as many forecasts as possible in order to work properly. Given the daunting task of having to input a large number of forecasts individually, forecasting systems usually lack the requisite amount of information necessary to generate an accurate prediction. As such, current forecasting systems are inadequate.

In addition, forecasting systems are usually not integrated with the research that must be performed. Typically, a forecaster is required to switch between systems in order to research and forecast. The lack of an integrated research and forecast tool generates numerous errors and frustration on the part of the user.

What is needed is a system and method that can provide research and allow a user to provide and obtain forecasts in an efficient manner. What is further needed is a system and device that can gather and manipulate numerous forecasts to generate a desired result.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements. A system, method, device, business method, and computer program for using a graph and graphical interface for both input and output is provided. The graphical interface and the combined input/output nature of the user interface has particularly useful application for the purpose of capturing various types of predictions and forecasts from users relative to future events or conditions.

A technique for providing predictions involves gathering and calculating a prediction from user input. An example of a system according to the technique includes a graph module, a submission module, a retrieval module, a calculation module, and a display module. The graph module can have an interactive portion and optionally a static portion. The static portion of the graph when provided can contain a plot of past data points. The interactive portion of the graph can be capable of and adapted for plotting future data points provided by a user.

The submission module can be capable of gathering and sending the future data points provided by the user to a database. The retrieval module can be capable of retrieving future data points from the database. The calculation module can be capable of performing a desired function on the retrieved data points to achieve a desired result. The display module can be capable of displaying the desired result on the interactive portion of the graph.

In certain embodiments, the database can contain future data points from a plurality of users. In one embodiment, the graph module, submission module, calculation module, retrieval module and display module are integrated into one or more modules. In additional embodiments, the user can provide the future data points by drawing a line on the interactive portion of the graph. In alternate embodiments, the user can provide data into a receiving module and the receiving module can plot the data on the interactive portion of the graph.

As discussed above, in certain embodiments, the technique incorporates a graphical user interface in which clicking on a graph replaces more time-consuming typing. The interactive graph results in fewer typographical errors and allows forecasts to be generated faster. Further, in certain embodiments, the submission module can analyze a prediction line drawn the user and send the data to a database for storage. In some embodiments, the submission module can incorporate interpolation and/or extrapolation algorithms in order to generate a large number of forecasts from a relatively small number of direct inputs from the user. In some embodiments, the submission module can rather than analyzing a line drawn by the user, analyze a user mouse click, a user touch-screen or touch pad or pen input, or another user input graphical interaction using a pointing device, key stroke, voice input, or other interaction on or relative to the interactive portion of the graph to determine the user input.

In some embodiments, the graph can be used to gather and predict financial data, including by way of example and not limitation, the Dow Jones Industrial Average, NASDAQ Stock Market, bonds, mutual funds, stock prices, a market index, a group of stocks, a stock index, a stock price, a mutual fund price, a currency price, a bond price, a bond rating, a credit rating, an Exchange Traded Fund, and/or any other convenient and/or known financial data capable of prediction. In other embodiments, the graph can be used to gather and predict any type of desired information, including but not limited to, commodities, articles of trade, sport outcomes, numerical outcomes, weather, or any other convenient and/or known desired information capable of prediction.

An example of a method according to the technique involves providing a graph having an interactive portion and optionally a static portion. User input is received via the interactive portion of the graph and stored into a database. In certain embodiments, the user input can be received by analyzing a line drawn on the graph by the user. In other embodiments, the user input can be received from field data. Desired information is retrieved from the database and displayed on the interactive portion of the graph. In some embodiments, the static portion of the graph when optionally provided can correspond to previous events, such as for example and not limitation, past stock prices, while the interactive portion of the graph can correspond to future events, such as for example and not limitation, future stock prices. In further embodiments, the method can be implemented using a computer-readable storage medium that stores program code.

The proposed system, method and device can offer, among other advantages, an improved forecasting mechanism. This can be accomplished in an efficient and robust manner compared to other forecasting mechanisms. Advantageously, the proposed system, method and device can gather information from users regarding future performance and optionally but advantageously display past performance on a single graph. The proposed system, method and device can generate and display a composite prediction based on previous user input. By using a graph, a large amount of user information is easily collected, stored and displayed.

These and other advantages of the present invention will become apparent to those skilled in the art upon a reading of the following descriptions and a study of the several figures of the drawings.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION OF EMBODIMENTS OF THE INVENTION

Figure 1:
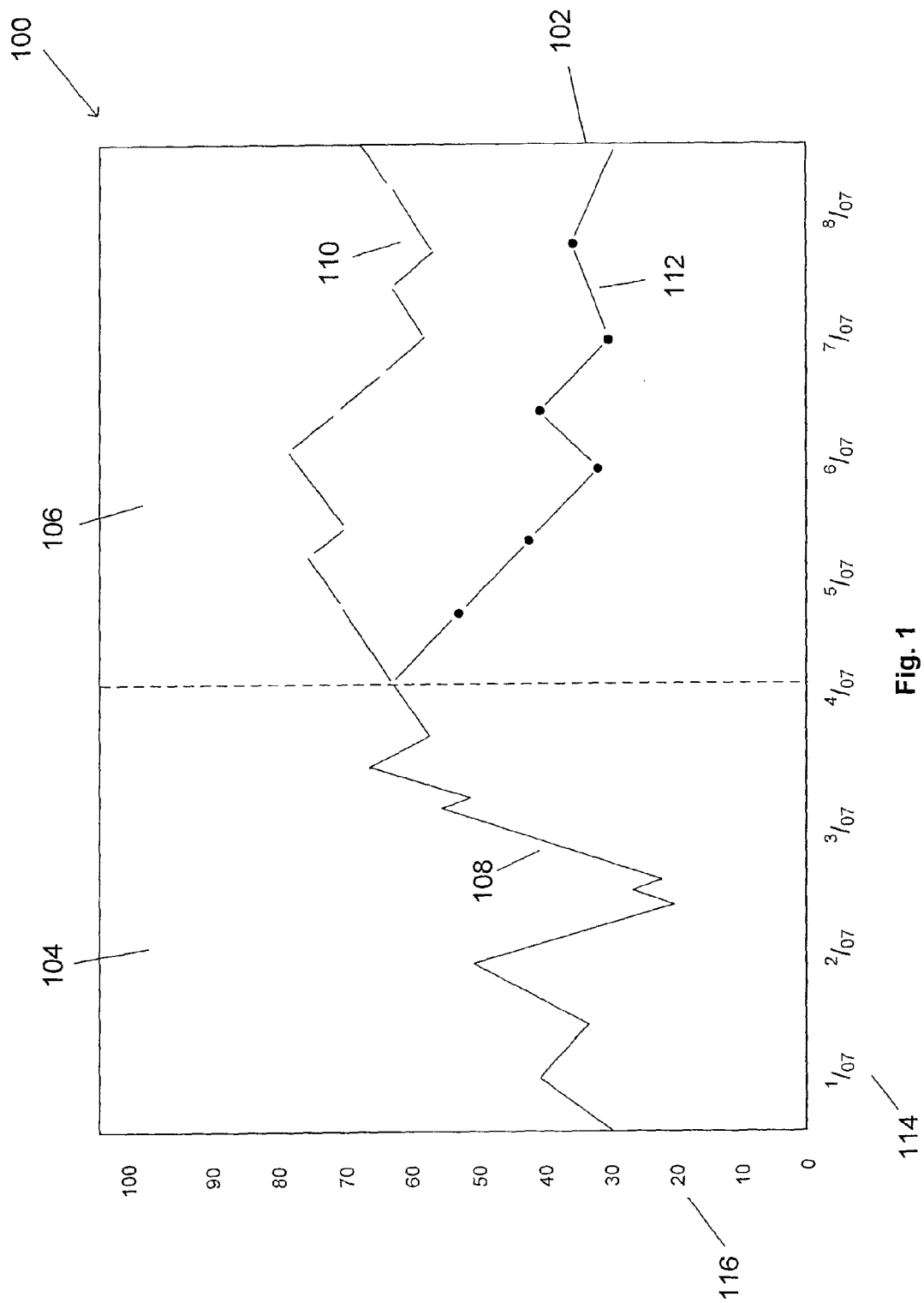
FIG. 1 depicts an example of a graphical forecasting interface for gathering and predicting information.

In the following description, several specific details are presented to provide a thorough understanding of embodiments of the invention. One skilled in the relevant art will recognize, however, that the invention can be practiced without one or more of the specific details, or in combination with other components, and the like. In other instances, well-known implementations or operations are not shown or described in detail to avoid obscuring aspects of various embodiments of the invention. A system, method, device, and computer program for using a graph and graphical interface for both input and output is provided. The graphical interface and the combined input/output nature of the user interface has particularly useful application for the purpose of capturing various types of predictions and forecasts from users relative to future events or conditions. The future prediction or forecast portion primarily pertains to the interactive portion of the graph, while past or historical events or conditions primarily pertain to the optional static portion of the graph. Advantageously, the graphical interface provides both static and interactive portions.

The inventive graphical interface (GI) or when applied specifically to forecasting, the graphical forecasting interface (or GFI) is a single interactive visual interface where users simultaneously receive and supply data. The system, device, method, and computer program allows users to modify or append new information to data graphs. The greater benefit of the GFI arises from the fact that it enables real-time data analysis and exchange. With centralized data storage, a large or geographically distributed group can graphically create, review and modify peer forecasts in real-time. Quickly processing and exchanging data greatly accelerates group data analysis in any domain, particularly in financial forecasting domains where timeliness is of benefit. In an exemplary embodiment of future forecasting of stock or commodity pricing or other measures, the inventive graphically based techniques allows analysts to both review historical performance and forecast future performance of stocks and/or commodities.

Aspects of using collective intelligence for forecasting are described in co-pending U.S. patent application Ser. No. 10/107,420, filed 26 Mar. 2002, entitled "System and Method For Forecasting Information Using Collective Intelligence from Diverse Sources," by inventor Craig Andrew Kaplan, which application is hereby incorporated by reference.

It will also be appreciated in light of the description provided herein that the graphical forecasting interface innovation may be applied in any domain that utilizes graphically plotted or graphically plottable data and is not limited only to forecasting or prediction, while at the same time realizing that the graphical and data handing techniques and tools provide particularly valuable advantages in the domain of forecasting and prediction over an interactive media.

FIG. 1 depicts an example of a graphical forecasting interface 100 for gathering and predicting information. In the example of FIG. 1, the graph forecasting interface 100 includes a graph module 102, an optional static portion 104, an interactive portion 106, an optional past data line plot 108, a user prediction line plot 110, a composite user prediction line plot 112, dates 114, and stock prices 116. As shown, the current date is approximately April 2007 and the current stock price is approximately 60 as indicated by the intersection of the past data point line 108 and the prediction lines 110 and 112.

In the example of FIG. 1, In operation, a user optionally observes the graph module 102 to learn about the price history of a stock. It will be apparent in light of the description provided herein that knowledge of a past history or performance will enhance the ability of a user to predict or forecast a future event, such as a future price of a stock, however, although disadvantageous, the display or observation of the past performance is not required so that a future prediction might be made without the past knowledge or without specifically displaying past performance on the graph. Non-limiting embodiments of the invention therefore include a graphical forecasting interface and underlying database and algorithmic infrastructure for predicting or forecasting future events without requiring the display of past historical "static" information. Advantageously, the user may consider past performance and subsequent description will assume for the purpose of this description that this optional reference to past performance occurs.

After considering the past performance of the stock, the user draws a prediction line 110 for the future price of the stock in the interactive portion 106 of the graph module 102. The prediction line 110 contains a plurality of data points for a variety of future dates. In alternate embodiments, the user can draw the line using an on-screen cursor, keyboard, mouse, touch screen, pointing device, and/or anything capable of drawing a line on a graphical interface.

To view previous user predictions, the user can activate the submission module. The submission module gathers and sends the user's predictions to a database for storage. A retrieval module retrieves the predictions from the database which includes predictions from previous users and the user's predictions. A calculation module performs a desired function on the retrieved data. In the example of FIG. 1, the calculation module generates a statistical or mathematical function or calculation or transformation, such as for example an average, a weighted average having uniform or non-uniform weights applied to each user input or prediction, based on all predictions submitted from a plurality of predictors to the database. A display module displays the average of the predictions as illustrated by the composite user prediction line plot 112.

In one non-limiting embodiment, the submission module can gather the user's prediction using interpolation and/or extrapolation. By way of example and not limitation, using linear interpolation, the submission module can determine a forecast for any point along a line provided by the user. For further example, and not limitation, using linear extrapolation, the submission module can determine a forecast for points exceeding the line.

In one non-limiting embodiment, the GFI may accept data points from users covering any time frame, including for example from a past time frame instead of or in addition to a future time frame. While the input of and acceptance of data points for a past time frame may not truly be a future prediction it may be the user's prediction of an event that has occurs but for which the user has no actual knowledge. The inventive graphical interface may also be used to capture data about past performance from users. Such past performance may be actual factual data or a prediction or forecast of a data.

In other embodiments, the graphical forecasting interface can be used to gather information about and predict any convenient and/or known event and/or outcome. By way of example and not limitation, the graphical forecasting interface can be used to gather and predict a Dow Jones Industrial Average, NASDAQ Stock Market, bond, mutual fund, commodity, article of trade, sport outcome, numerical outcome, financial outcome, weather and/or any other type of event a user would wish to forecast.

Also, in additional embodiments, the graph module can be represented in any convenient and/or known manner capable of conveying (optional) past performance and allowing the entry of future performance or behavior. By way of example and not limitation, the graph module can be represented by a bar graph, pie chart, pictogram or any other type of object and/or shape capable of conveying information to the user. Further, the axis of the graph can be any convenient and/or known data capable of measurement and comparison.

As shown in the example of FIG. 1, the graphical forecasting interface is an interactive visual interface where users can simultaneously receive and supply data. The system can allow users to modify or append new information to data graphs. In certain embodiments, the data can be stored centrally enabling a large or geographically distributed group to graphically create, review and modify peer forecasts in real-time. One embodiment of the system functions of the graphical forecasting interface can be found in Provisional Patent Application No. 60/719,704 entitled Graphical Forecasting Interface by Craig Kaplan and Calen Lopata which is incorporated herein by reference.

Figure 2:
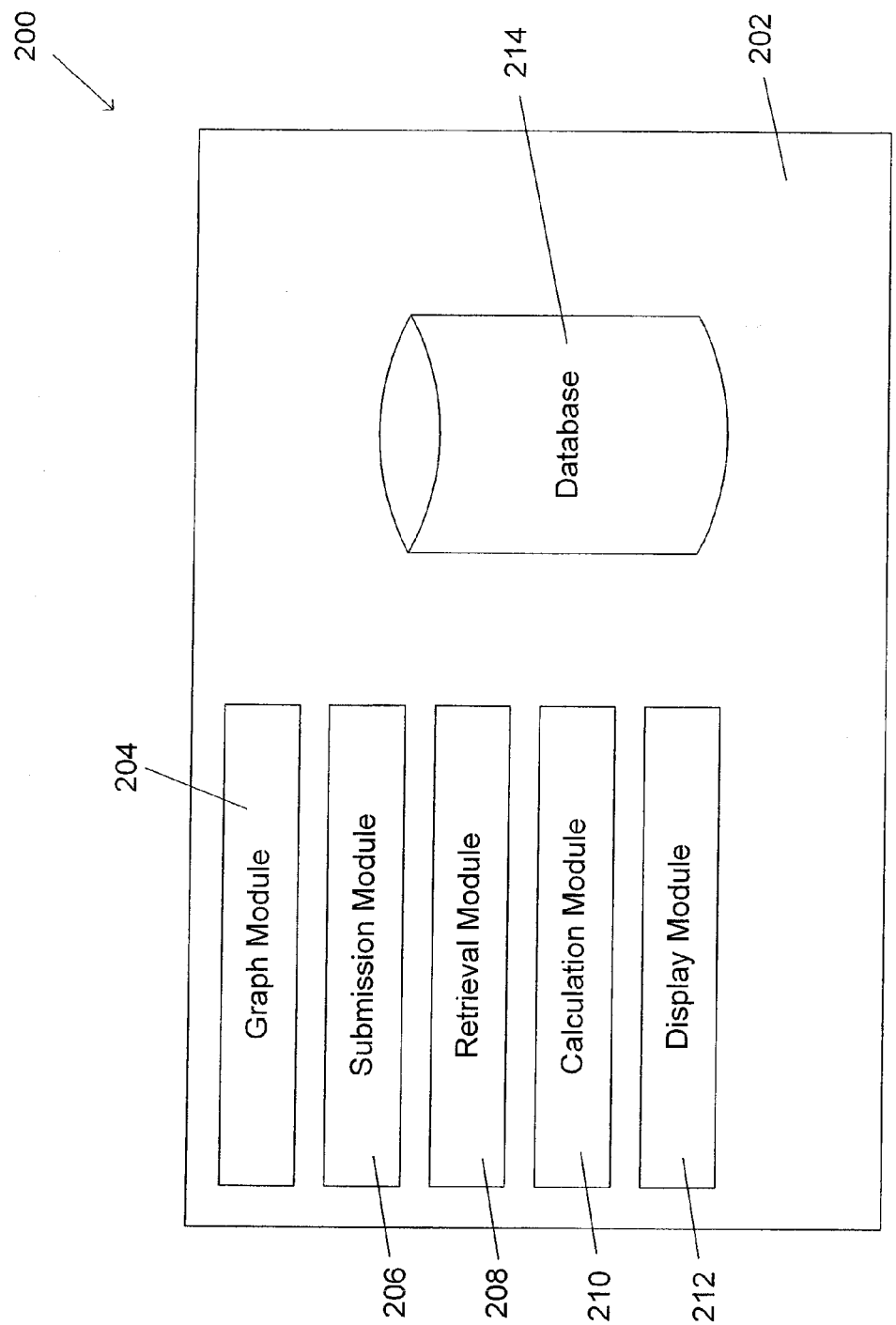
FIG. 2 depicts an example of system for gathering and predicting information.

FIG. 2 depicts an example of system 200 for gathering and predicting information. In the example of FIG. 2, the system 200 includes a computer 202, a graph module 204, a submission module 206, a retrieval module 208, a calculation module 210, a display module 212, and a database 214. As shown, the graph module 204, submission module 206, retrieval module 208, calculation module 210, display module 212 and database 214 are integrated on a single computer 202. In alternate embodiments, the modules 204-212 and/or database 214 can be located on separate local and/or remote machines. Further, in other embodiments, the modules 204-212 can be integrated and executed as a single module.

In the example of FIG. 2, the graph module 204 displays a graph to a user having a static portion and an interactive portion, in certain embodiments, the static portion and the interactive portion of the graph are shown on a common screen. In other embodiments, the static portion and the interactive portion can be shown on separate screens and a user can toggle between the two portions of the graph.

The submission module 206, in the example of FIG. 2, receives data as provided by the user on the interactive portion of the graph. The submission module can gather data using any known and/or convenient gathering technique. By way of example and not limitation, if a user draws a line on the interactive portion of the graph, the submission module can extract a variety of points along the line. After capturing the data, the submission module 206 sends the data to the database 214 for storage. The database can be any convenient and/or known storage mechanism capable of storing data. By way of example and not limitation, the database can be a relational database. In alternate embodiments, the database can be non-volatile memory which can be removable and/or non-removable.

The retrieval module, in the example of FIG. 2, retrieves the data from the database 214. The retrieval process can be facilitated using any convenient and/or known method capable of extracting data from a database. The retrieval module passes the retrieved data to the calculation module for manipulation. In the example of FIG. 2, the calculation module calculates a mean of the retrieved data. In other embodiments, the calculation module can implement any known function to obtain a desired result. In certain embodiments, the calculation module is located within the database 214 and the calculation is performed before retrieval by the retrieval module 208.

In the example of FIG. 2, the display module 212 displays the desired result on the interactive portion of the graph. Continuing with the example, the mean of the data or other processed or unprocessed version of the data in the database is displayed on the interactive portion of the graph. In some embodiments, the user may select the type of processing to be applied to the data from the database, such as mean, average, median, or other statistically processing result taking into account some or all of the other user inputs. In some embodiments, the desired result can be overlaid upon the user's predictions. In other embodiments, the user's predictions can be replaced with the desired result. In some embodiments, the display module is adapted to display or overlay more than one line or set of lines or curves on the graph. Where multiple lines or curves are displayed, each line or curve may represents either historical or future data for one or more item of interest. By way of example but not of limitation, a user may choose to see displayed forecasts for "Company X" and "Company Y" stock on the same graph. In another non-limiting example, a user may choose to see the forecasts of expert predictors and novice predictors on the same graph for "Company Z" stock. The inventive system may track the forecasting performance of users and maintain a record in the same or a different database of the forecasting experience and/or accuracy of different users so that determinations and/or qualifications of the user as an expert or novice may be made. These categories may be for particular areas rather than globally, so that by way of example but not of limitation, an expert for computer company stocks may only be a novice user relative to airline industry stocks or a commodities market.

Figure 3:
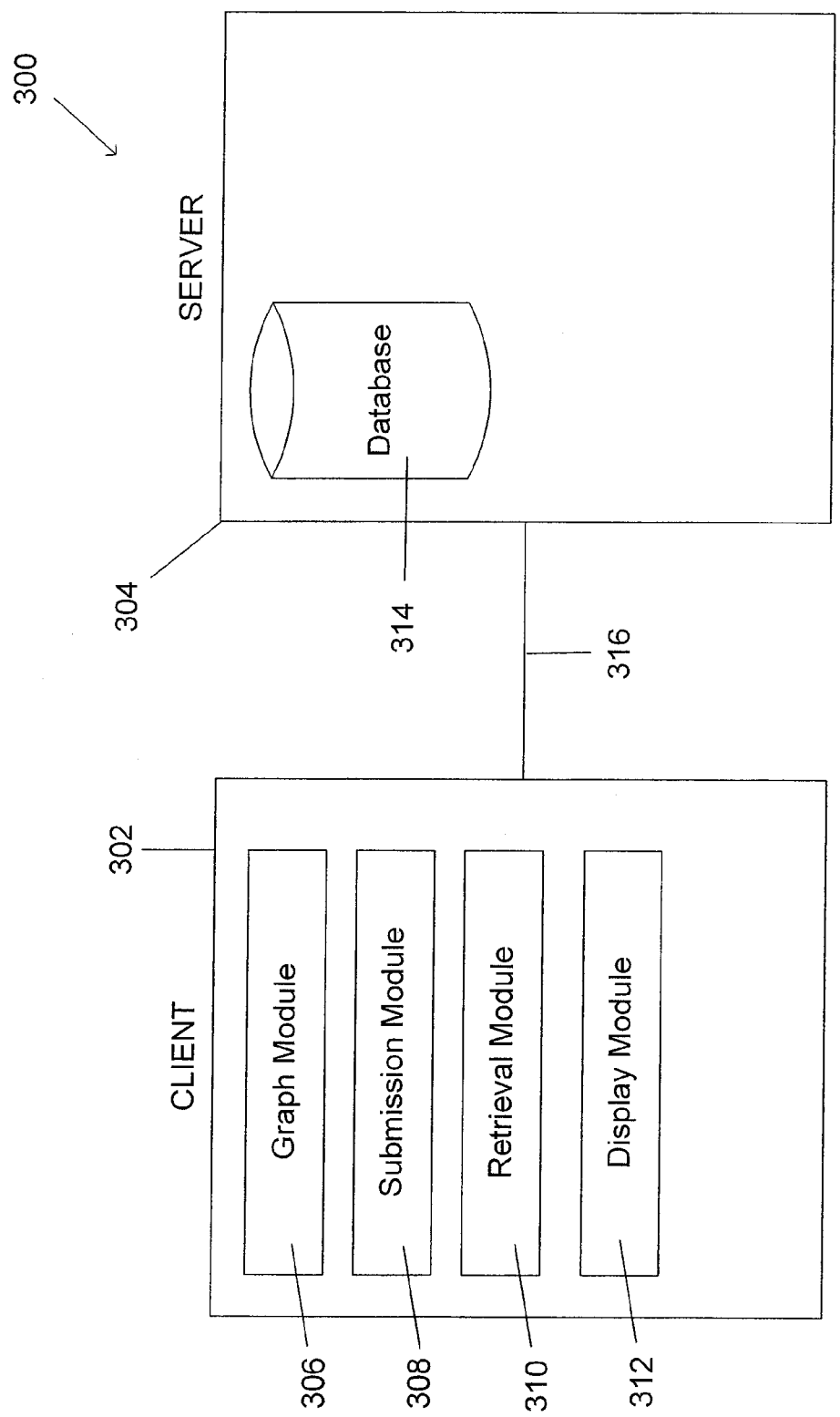
FIG. 3 depicts an alternate example of system for gathering and predicting information.

FIG. 3 depicts an alternate example of system 300 for gathering and predicting information. In the example of FIG. 3, the system 300 includes a client computer 302, a server computer 304, a graph module 306, a submission module 308, a retrieval module 310, a display module 312, a database 314, and a communication network 316. As shown, the graph module 306, submission module 308, retrieval module 310, display module 312 are integrated on the client computer 302. The database 314 is located on the server computer 304. In alternate embodiments, the modules 306-312 can be located on additional clients and/or servers. One or more local, remote, and/or distributed servers may be implemented to perform the functions of server computer 304. Further, the modules 306-312 can be integrated and/or divided among any convenient number of modules.

In the example of FIG. 3, the graph module 306 displays a bar graph to a user having a static portion and an interactive portion. The static portion of the graph displays the previous prices of oil. The user draws a bar graph in the interactive portion to indicate the future price of oil. The user then activates the submission module 308 in order to view the predictions of other users.

The submission module 308, in the example of FIG. 3, receives the user's predictions on the interactive portion of the graph by analyzing the bar graph drawn by the user. In other embodiments, the submission module can gather the bar graph data using any known and/or convenient gathering technique. After capturing the data, the submission module 308 sends the data across the communication network 316 to the remote database 314 which is located on the server 304. The gathered data can be stored and used for any convenient and/or known purpose. By way of example and not limitation, the data can be used for predictions, web traffic, marketing, sales, tracking, advertising, or any other convenient and/or known statistic.

Once the gathered data is stored, in the example of FIG. 3, the retrieval module retrieves data from the database 314 via the communication network 316. In the example of FIG. 3, the retrieval module 310 only retrieves a select portion of data in the database 314 pursuant to a confidence algorithm. In the example of FIG. 3, the retrieved data does not include the user's prediction because it is outside the confidence level.

In the example of FIG. 3, the retrieval module manipulates the retrieved data in order to obtain a desired result. Thus, in the example of FIG. 3, the retrieval module and calculation module are integrated into the retrieval module. In other embodiments, the retrieved data does not need to be manipulated if manipulation is unnecessary. Continuing with the example of FIG. 3, the retrieval module calculates the median of the retrieved data. The display module 312 displays the desired result, namely the median of the retrieved data, on the interactive portion of the graph.

In the example of FIG. 3, the server 304 and database 314 facilitate central data storage. Central data storage permits multiple unique and asynchronous users to access the system, contribute information and view other users' information in real-time. Also, in the example of FIG. 3, the modules 306-312 can be implemented as computer program software executing within a processor and memory of a general or special purpose computer and modifying the operation of that computer to achieve a technical effect, hardware, firmware or any other convenient and/or known implementation capable of carrying out the functions of the modules. By way of example and not limitation, the modules 306-312 can be written in Java, C, C++, Visual Basic, or any other convenient and/or known language capable of allowing network communication and a graphical ("point-and-click") interface. In some embodiments, the system can be deployed as a stand-alone program or as program that runs in web browsers.

In some embodiments the transmission of data across the communication network can be implemented using any convenient and/or known communication technique. By way of example and not limitation, the client can receive and/or send data using poll techniques, push techniques, on-demand technique, or any other technique capable of transmitting data. For further example, and not limitation, the server can receive and/or send data using poll techniques, push techniques, on-demand technique, or any other technique capable of transmitting data.

In one non-limiting embodiment, the graphical forecasting interface is implemented using a data-centered architecture. When using this approach, the GFI may advantageously be designed with a data-centered (client-server) architecture as information sharing greatly increases the value of the GFI for the user. Without information sharing, the GFI would allow a user to manipulate and store data for his own use which is itself useful and valuable. Central data storage or at least storage that is accessible to a plurality of users if not centralized additionally and advantageously permits multiple unique and asynchronous users to access the graphical interface, contribute information, and view other users' information (such as their forecasts and predictions) in real-time or in near real time giving minor communication delays that may occur over and interactive electronic communications medium such as the Internet or other network. To enable the real-time exchange of complex data sets, GFI may advantageously be designed as a data-centered application.

In one non-limiting embodiment, a JAVA™ implementation may advantageously be utilized, but it is not limited only to JAVA implementations. The graphical input/output device may advantageously be implemented using computer software in order to provide maximum flexibility and the rapid exchange of information. The computer program software or code for the GFI could be written in Java, C, C++, Visual Basic, or various other languages that allow network communication and a graphical ("point-and-click") interface. Java is advantageously used implementation language because it satisfies these basic requirements and, most importantly, is extremely portable. One program written in Java can run on a wide variety of operating systems and computer architectures. In addition, small Java programs, or applets, can be easily distributed via the Internet through Java-enabled web browsers without requiring any special installation procedures. Meeting the functional requirements and offering the widest compatibility makes Java, or languages with similar capabilities, advantageous for GFI implementation.

If written in Java™, the GFI may be deployed as stand-alone program or as an applet that runs within Java-enabled web browsers. The GFI frequently communicates with other computers via the Internet for data storage and retrieval. The web browser, an inherently Internet-related program, is the most natural platform for deploying the GFI. An Internet-reliant program, the Java™ GFI can be deployed within a web browser as a Java™ applet in a preferred implementation.

In one non-limiting embodiment, the central data storage, or server side, component of the GFI is advantageously implemented and utilized to both store data and transmit data between the server and the device.

The server-side data storage functionality may typically be accomplished using a relational database. Any method of saving GFI data in non-volatile memory would be sufficient, but databases and database based procedures are preferred device and method due to their capabilities for organizing and efficiently retrieving data. In one non-limiting embodiment, the GFI central database is implemented using Microsoft SQL Server 7.0. A growing number of relational database comparable to SQL Server 7.0 exist and may be utilized. Robust graphical database management and built-in data analysis tools are all helpful for a preferred implementation.

In one non-limiting embodiment, the server-side GFI transmission of data, both from the server to the GFI and from the GFI to the server are provided. Several considerations are taken into account to derive a preferred data transmission method. First, it is advantageous to choose the method by which the GFI will receive its data. The GFI could constantly poll the server for new data, the server could send ("push") new data to the GFI as it becomes available, or the GFI could retrieve data from the server on-demand (for example, when the GFI user requests new data).

An On-Demand approach in which the GFI user requests data as-needed has the potential advantages of requiring a minimum network traffic and placing the user in full control, but the potential disadvantage that the GFI displays stale data until the user updates the data.

A polling approach in which the GFI periodically queries the server for new data is also a possible implementation strategy and has the potential advantage that the GFI data stays periodically updated without user intervention, but the potential disadvantages of either over-polling (polling although the server has no new data) or under-polling (the server has new data but the GFI does not poll for it).

A data push approach represents yet a third implementation strategy where the server sends new data to the GFI as new data becomes available on the server. This approach has the potential advantage that the GA data stays current with minimal data transmissions, and the potential disadvantage that additional overhead is required (such as overhead on the server) to maintain the connection to or store the network location of the GFI.

When deciding upon the data transmission method and means, both efficiency and the required frequency of GFI data updates may be considered. While any of the above described options may be selected and utilized (among others), in one non-limiting implementation, the GFI receives data on-demand. Data on-demand allows control and at least some minimization of the amount of data that must be sent to the GFI and leaves the user in control of data acquisition. Choosing to send server data on-demand also allows sending server data and client data in one transmission. Additional aspects of this approach are described relative to the client-side data transmission.

In one non-limiting embodiment, server-side data transmission is implemented as server "push", wherein the server sends new data to the GFI as the data becomes available on the server. Depending on the specific needs of the application and users, GFI may be implemented in other ways as mentioned above.

With respect to client-side data transmission, such transmission is used by the GFI in order to send data entered by the user from the GFI to the server. With client-side data transmission there are somewhat similar options as with server-side data transmission.

In an on-demand approach, the GFI user sends data as-needed. This approach on the client-side as the possible advantage that it uses less or a minimum network traffic, places the user in full control, and the user only sends data when input is complete. It has the potential disadvantage that the server may not have data as the user is entering it in the GFI.

In a client-side polling approach, the server periodically queries the GFI for new data. This approach as the possible advantage that the server data stays periodically updated without user intervention, but the possible disadvantage that over-polling (polling although the GFI has no new data or when the data in the GFI has not been finalized by the user), or under-polling (the GFI has new data but the server does not poll for it) may occur.

In a client-side push implementation where the GFI sends new data to the server as new data becomes available on the server there are also advantages and disadvantages. Advantages include that the server data stays current with minimal data transmissions. Disadvantages include the possibility that the data on the GFI will or may get sent ("saved") to the server before the user has finalized the data, such as while the user is modifying the data to add or modify one or more data points, which could lead to data on the server that does not represent what the user intended or at least not their final intention.

In one non-limiting embodiment, client-side data transmission is advantageously implemented using data on-demand. One potential problem with the push and polling methods is that both would store data on the server as soon as the user enters it. This can lead to excessive data transmission. For example, if the user were to enter a data point, then immediately delete that data point, the push and polling methods would cause the server to receive two data transmissions and update its records twice. For this same example, the data on-demand method would not send any data to the server. A second potential problem with push and polling is potential data inaccuracies on the server. For example, if a user erroneously enters a data point in the GFI, the push and polling methods would immediately submit the erroneous data to the server. The server would store this erroneous data, which could skew system-wide data until the user corrected the entry. With data on-demand, the user is be able to preview data entries and correct errors before committing the data to the server. We have implemented the GFI with client-side data sent on-demand to maximize transmission efficiency and server data integrity.

Therefore, while various data transmission schemes and techniques are possible, there are options that more readily overcome limitations and provide for improved performance.

Figure 4:
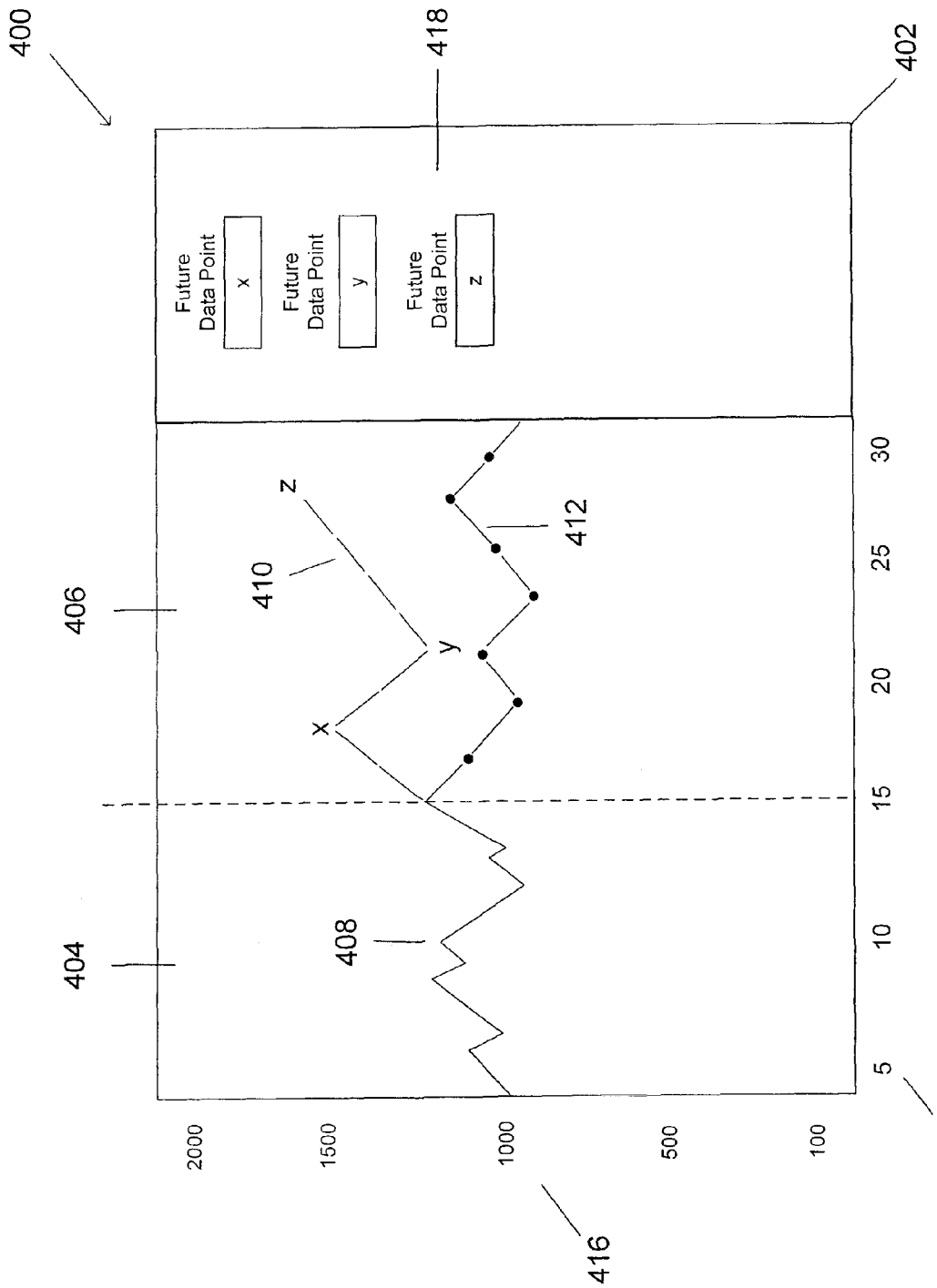
FIG. 4 depicts an alternate example of a graphical forecasting interface for gathering and predicting information.

FIG. 4 depicts an alternate example of a graphical forecasting interface 400 for gathering and predicting information. In the example of FIG. 4, the graph forecasting interface 400 includes a graph module 402, a static portion 404, an interactive portion 406, a past data point line plot 408, a user prediction line plot 410, a composite user prediction line plot 412, days of a month 414, commodity prices 416, and a receiving module 418. As shown, the current day is the 15$^{th}$ and the current stock price is approximately 1250 as indicated by the intersection of the past data point line 408 and the prediction lines 410 and 412.

In the example of FIG. 4, in operation, a user observes the graph module 402 to learn about the price history of a commodity. After considering the past prices of the commodity, the user inputs future data points into the receiving module 418 and the graph module 402 draws a corresponding prediction line 410 in the interactive portion 406. Although the user only provides three predictions, the prediction line 410 contains a plurality of data points for a variety of future dates.

In the example of FIG. 4, to view previous user predictions, the user can activate the submission module. The submission module sends the user's three predictions to a database. In other embodiments, the plurality of data points for the variety of future dates can be gathered and sent to the database. A retrieval module retrieves predictions from previous users, which includes the user's predictions, from the database and a calculation module performs a desired function on the retrieved data. In the example of FIG. 4, the calculation module discards extreme values and averages all other predictions according to a custom algorithm. A display module displays the result of the function on the interactive portion 406 of the graph as illustrated the composite user prediction line plot 412.

Figure 5:
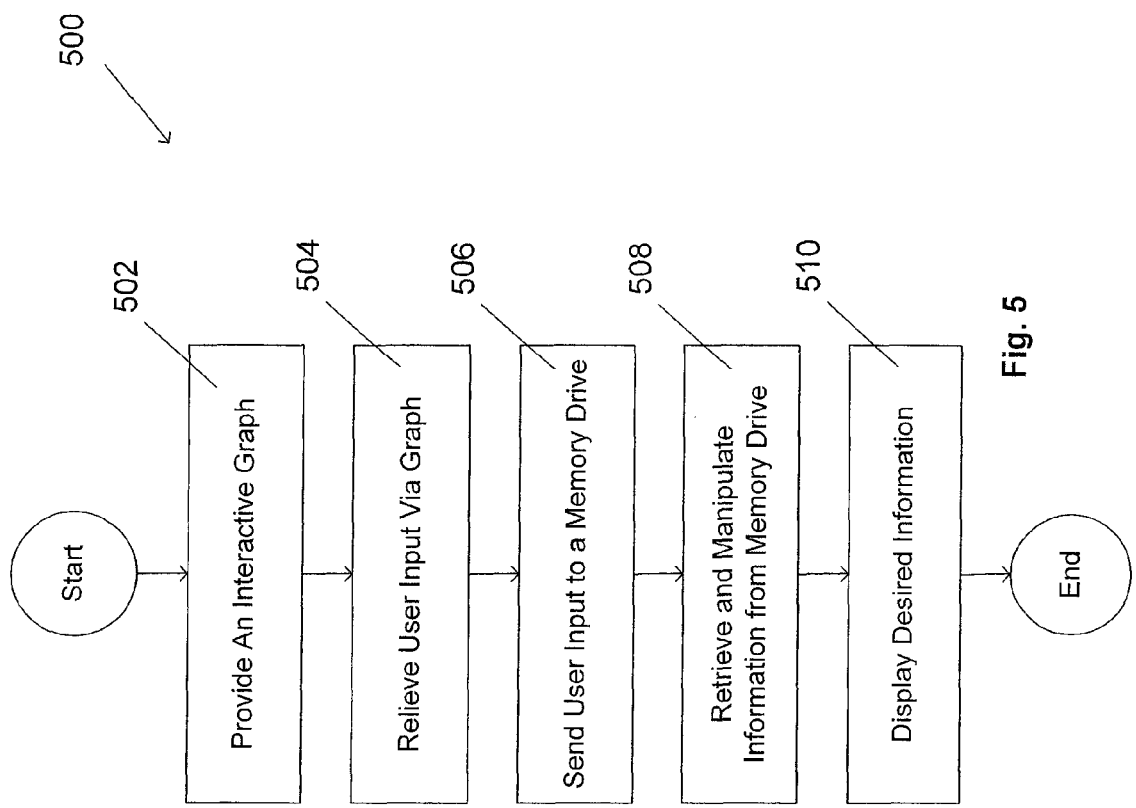
FIG. 5 depicts a flowchart of an example of a method for gathering and predicting information.

FIG. 5 depicts a flowchart 500 of an example of a method for gathering and predicting information. FIG. 5 is intended to illustrate the operations performed by a graphical forecasting interface. In the example of FIG. 5, the flowchart starts at module 502 where an interactive graph is provided. In one embodiment, the interactive graph can have a static portion and an interactive portion. In other embodiments, the interactive graph can be completely interactive with no static portion.

In the example of FIG. 5, the flowchart 500 continues at module 504 where user input is received by way of the interactive graph. In one embodiment, the user can draw on the interactive graph and data can be interpolated and/or extrapolated from the drawing. In other embodiments, the user can input data into one or more fields and data can be received via the field values.

In the example of FIG. 5, the flowchart 500 continues at module 506 where the user input is sent to a memory device. In certain embodiments, the memory device can be local. In other embodiments, the memory device can be remote and the user input can be sent over a communication network. In alternate embodiments, the memory device can be a database for storing user input.

In the example of FIG. 5, the flowchart 500 continues at module 508 where information is retrieved and manipulated from the memory device. In one embodiment, the information can include the user input. In other embodiments, the information can be restricted according to any desired criteria. In further embodiments the data can be manipulated by applying an algorithm, mathematical function, logic diagram, or any other convenient and/or known technique necessary to obtain the desired result. In additional embodiments, the manipulated data can be the information as retrieved if no change to the data is desired.

In the example of FIG. 5, the flowchart continues at module 510 where desired information is displayed. In one embodiment, the desired information can be displayed on the interactive portion of the graph. In other embodiments, the desired information can be displayed on a separate graph, report, screen, or any other convenient and/or known apparatus capable of conveying information.

As described herein above, the inventive Graphical Forecasting Interface (GFI) provides a single interactive visual interface where users may simultaneously receive and supply data or information. The system, device, method and computer program and computer program product allows users to modify or append new information to data graphs and to generate or modify a database or database entry to reflect or capture the graphical interface input. The GFI enables real-time data analysis and exchange. With possible centralized data storage, a large or geographically distributed group of users or analysts can graphically create, review and/or modify peer forecasts or predictions in real-time. Quickly processing and exchanging data greatly accelerates group data analysis in any domain.

While embodiments of a graphical forecasting interface have been described above in both general and exemplary specific terms, in at least some embodiments of the invention, particular features and/or tools have been provided. These features and tools are believed to be novel at least for use in forecasting and prediction over an interactive electronic medium and although the invention is not limited to the particular features and tools now described, they do provide advantageous operation and performance. It will be appreciated in light of the description provided herein that although all of the features and tools provide particularly advantageous operation, different embodiments of the invention may provide none, all, or only selected ones of these optional features and tools in any combination.

Figure 6:
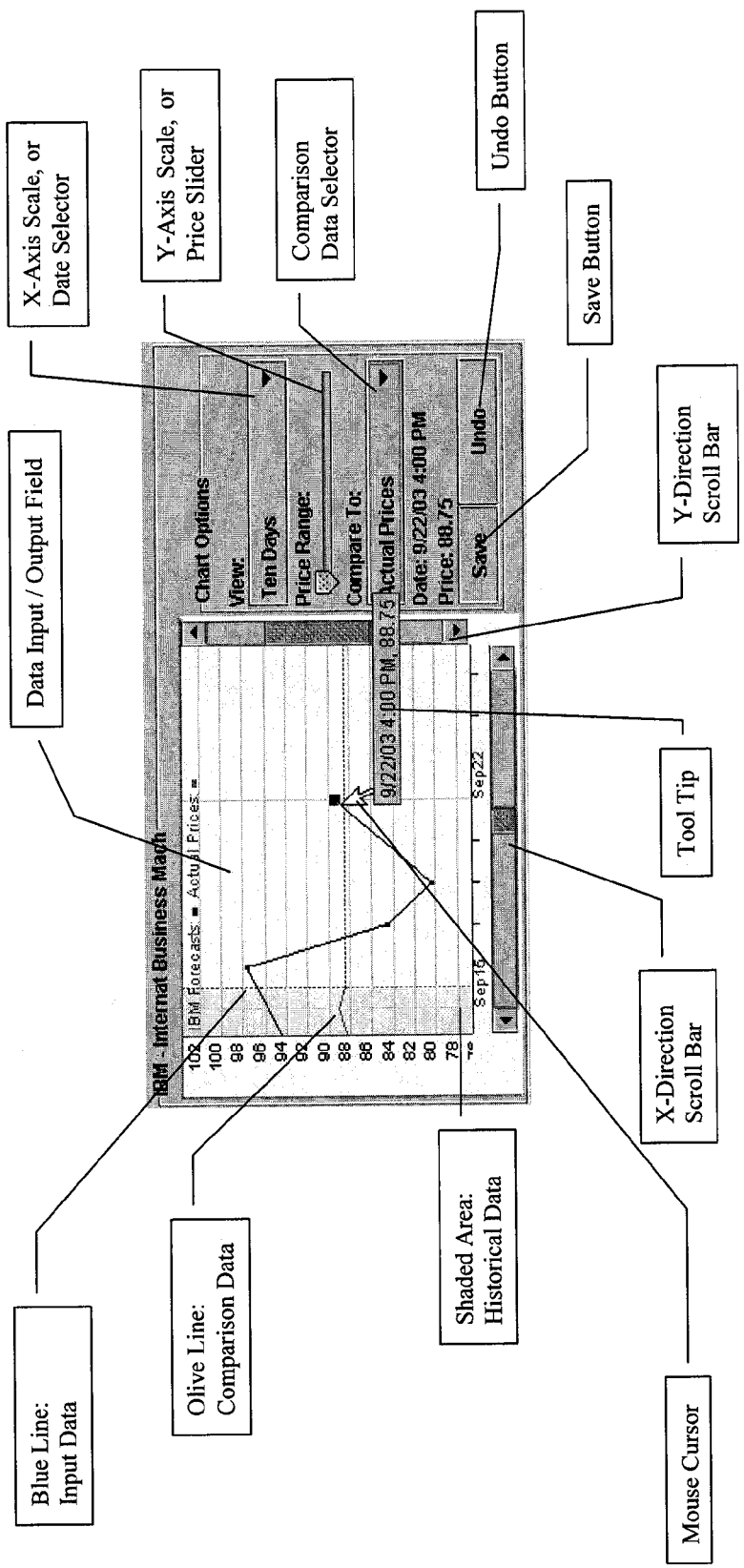
FIG. 6 depicts an exemplary graphical forecasting interface display showing exemplary graphical display outputs for a forecast or prediction.

FIG. 6 illustrates exemplary graphing capabilities and in particular, showing exemplary graphical outputs. In one exemplary non-limiting embodiment, the GFI plots both historical and future data on a line graph. The GFI can plot secondary data for comparison on the same graph using either a numeric scale or a delta (percentage change) scale.

Figure 7:
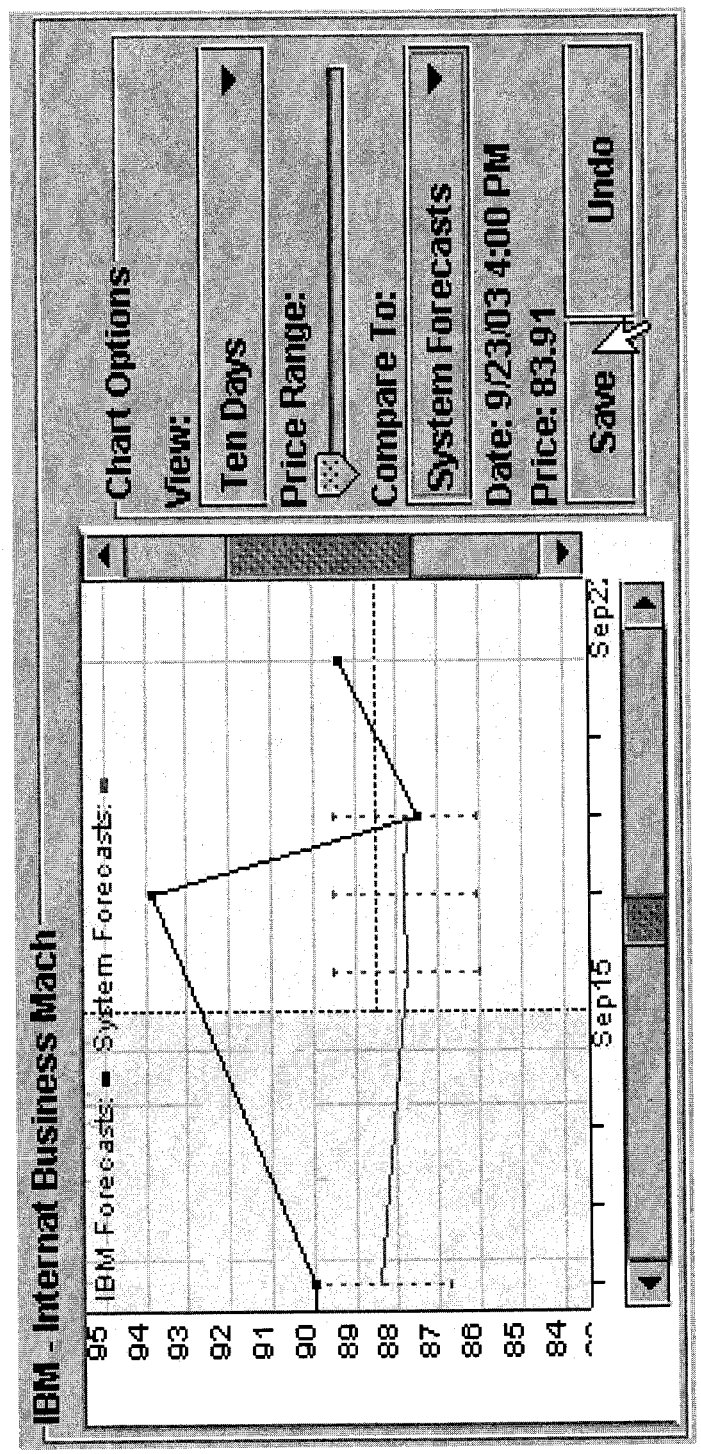
FIG. 7 depicts an exemplary graphical forecasting interface display showing exemplary confidence intervals.

With reference to FIG. 7, the inventive GFI may also optionally plot confidence intervals for each point or for selected points. A confidence interval may be a pair of y values—say, y1 and y2—associated with a particular (x, y) point. One y-value, say y1, should normally be greater than or equal to the y-value of the point. The other y-value should normally be less than or equal to the y-value of the point. When y1 and y2 are available for a given point (x, y), the GFI draws a dashed line from y1 to y2, which intersects (x, y). This dashed line visually represents a y-value range for the given x value. This is useful in demonstrating, say, the systems' confidence or expected error range for certain points.

Figure 8:
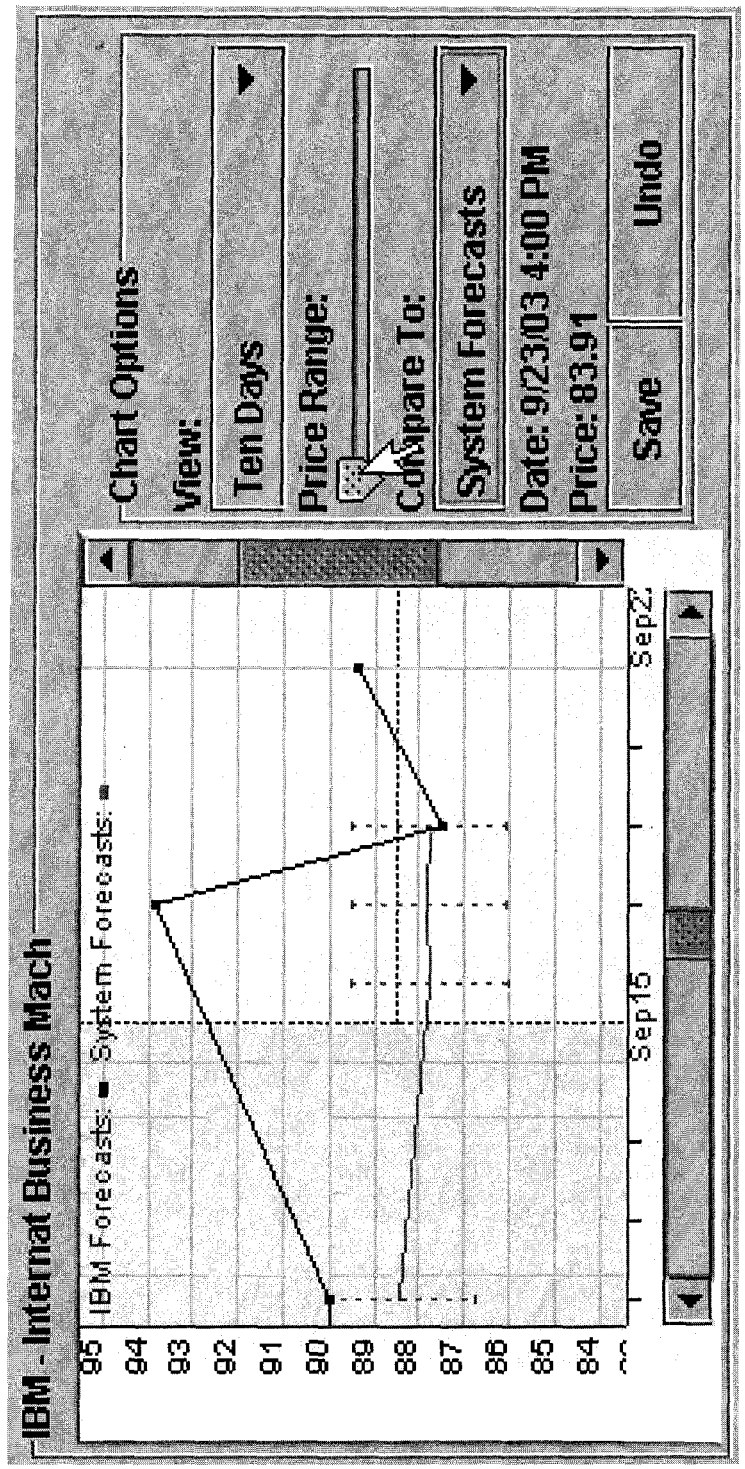
FIG. 8 depicts an exemplary graphical forecasting interface display showing exemplary y-axis zooming before zooming.
Figure 9:
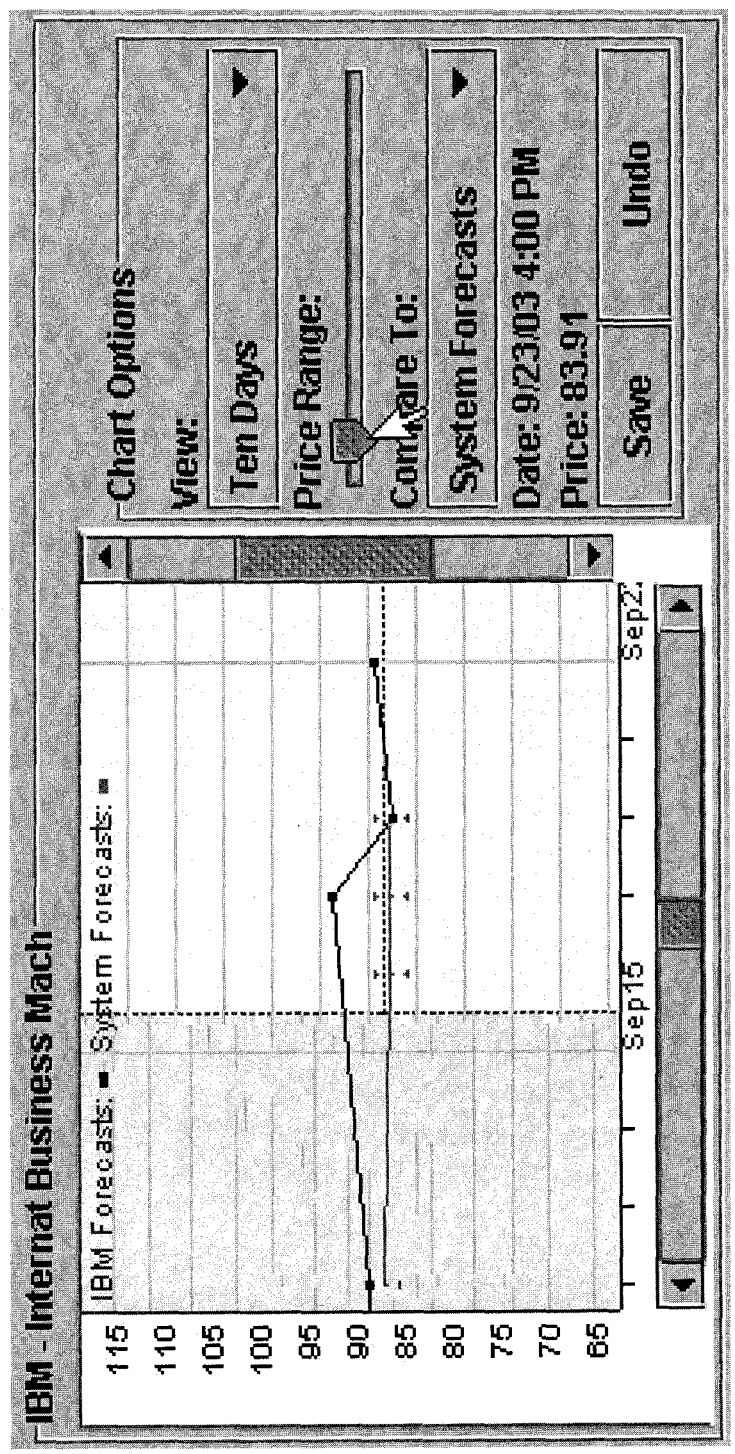
FIG. 9 depicts an exemplary graphical forecasting interface display showing exemplary y-axis zooming after zooming.

Embodiments of the invention may accepts and parse data input in delimited text or XML format or in other formats or data organizations or structures. Embodiments of the invention may further include any one or combination of x-axis, y-axis, or combined x-axis and y-axis (or other coordinate system) zoom features. In one non-limiting embodiment, the graphical forecasting interface incorporates a slider control that enables the user to "stretch" or "shrink" the y-axis dynamically, without reloading the graph. This feature provides a zoom-like functionality in the y-axis direction only. FIG. 8 illustrates the display before the y-axis zoom and FIG. 9 illustrates the display after the y-axis zoom.

Figure 10:
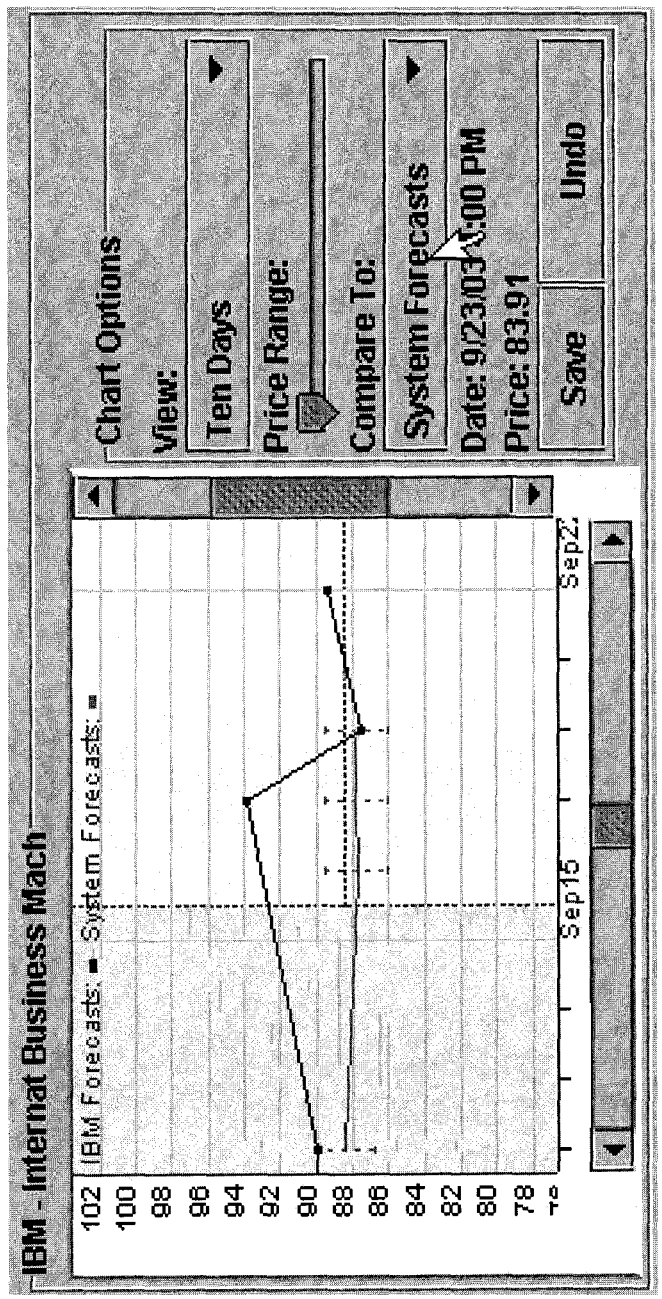
FIG. 10 depicts an exemplary graphical forecasting interface display showing an exemplary display before the x-axis zoom.
Figure 11:
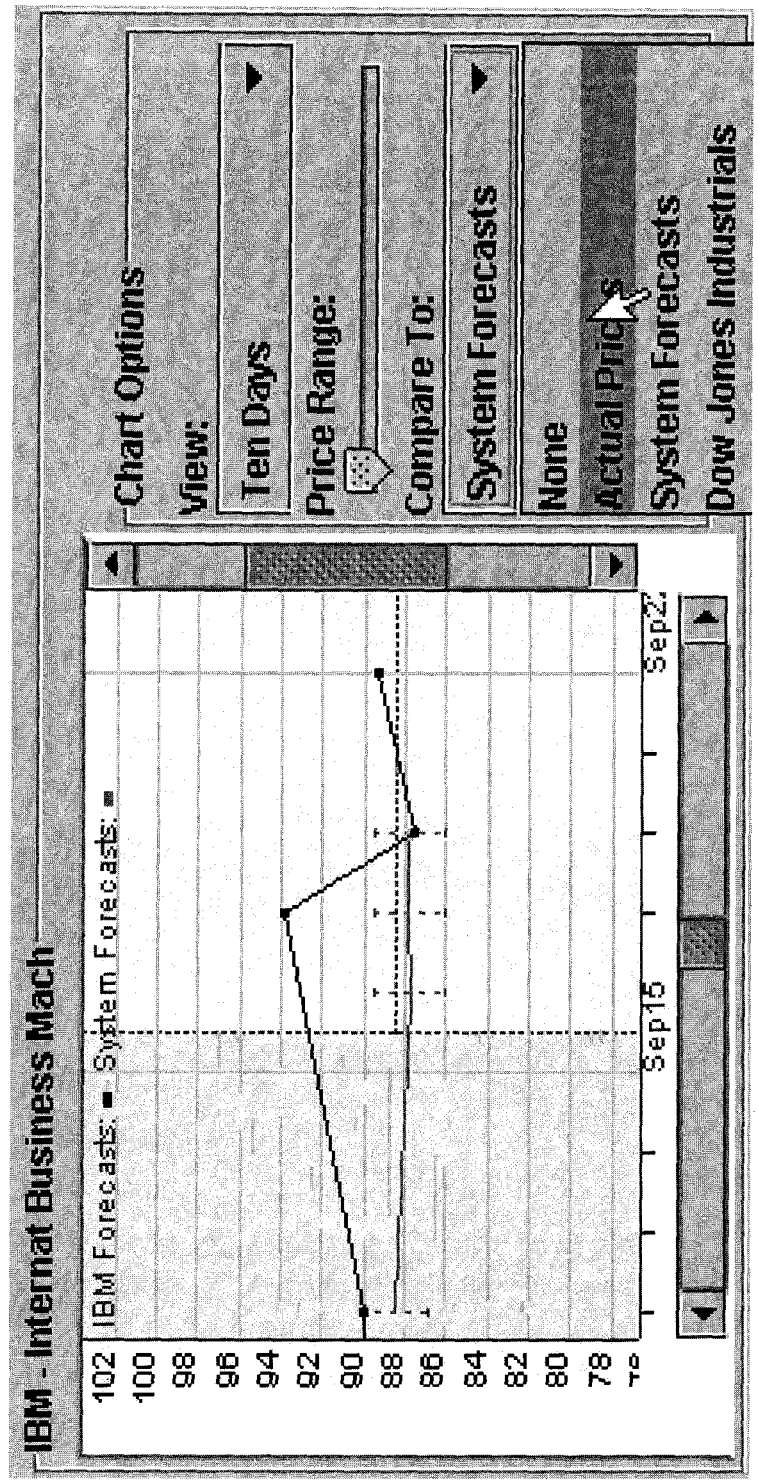
FIG. 11 depicts an exemplary graphical forecasting interface display showing an exemplary display during choosing of the x-axis zoom.
Figure 12:
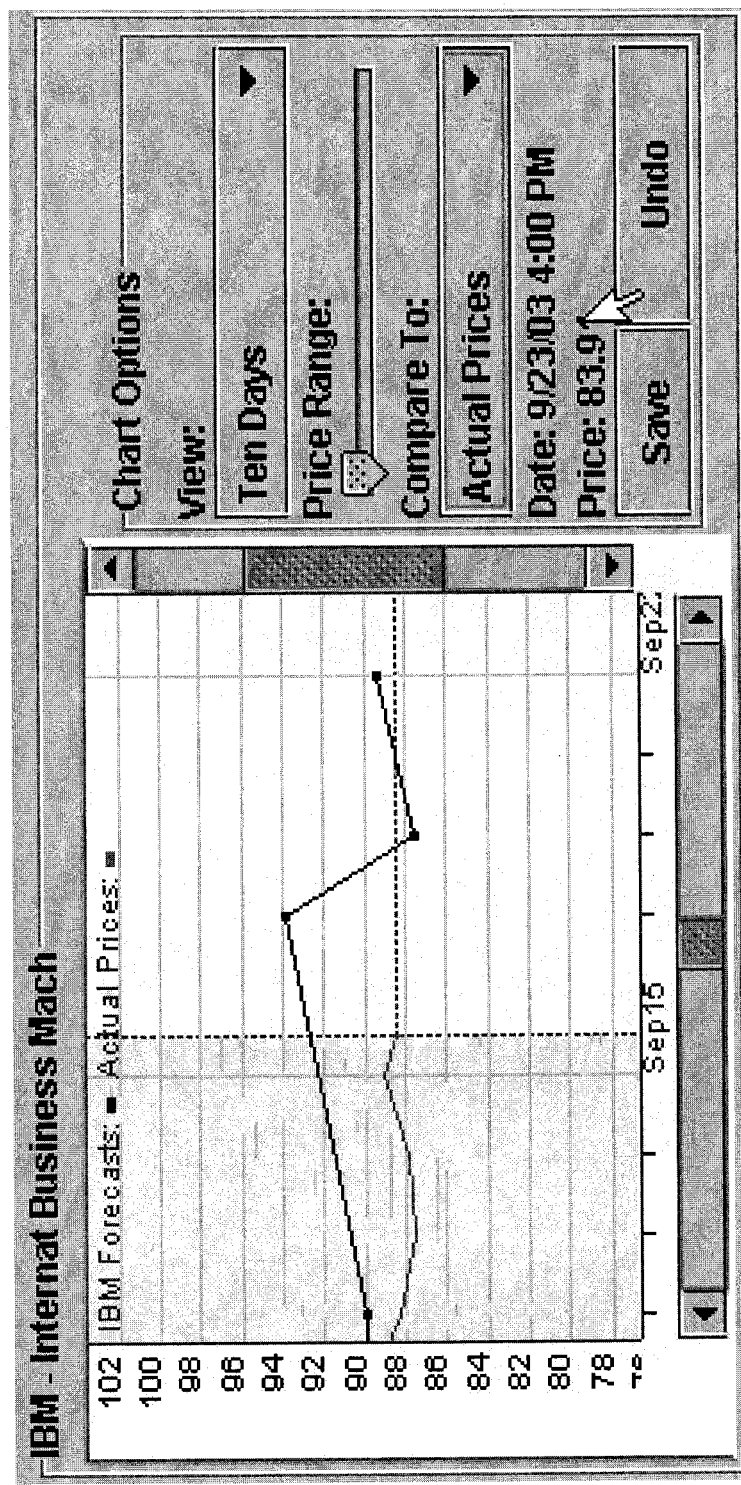
FIG. 12 depicts an exemplary graphical forecasting interface display showing an exemplary display after the x-axis zoom.

Embodiments of the invention may also incorporate a selector box or rectangle that enables the user to view different sized date/time ranges along the x-axis. For example, the user could select a "100-point" view, which allows the user to see approximately 100 points worth of data plotted in the graph window. This feature provides a zoom-like functionality in the X direction only. FIG. 10 illustrates the exemplary display before the x-axis zoom has been chosen and implemented, FIG. 11 illustrates choosing the x-axis zoom, and FIG. 12 illustrates the appearance of the display after the choosing and implementing the x-axis zoom feature or tool.

Figure 13:
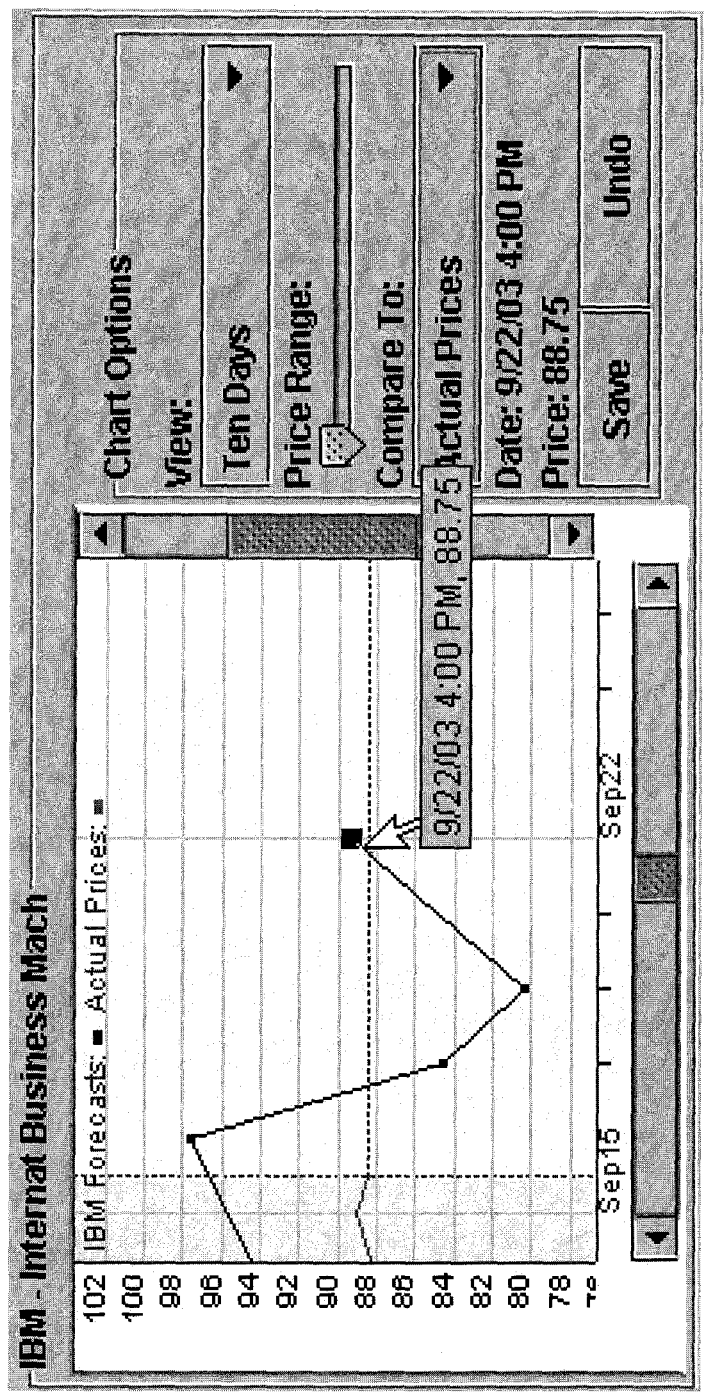
FIG. 13 depicts an exemplary graphical forecasting interface display showing exemplary GFI tool tips.

Embodiments of the invention also advantageously provide for graphically based plotting and/or input capture capabilities. In one non-limiting embodiment, whenever the mouse cursor or other pointing device occupies the display graph area, the GFI describes the current (x, y) point of that cursor. This description is displayed within the GFI to inform the user of the exact current mouse cursor location. The current mouse cursor location may be identified in terms of the x-axis and y-axis coordinates or units then presently displayed. Embodiments of the invention may also optionally but advantageously provide tool-tips, such as for example in the form of small, dynamically drawn boxes or other geometrical shapes of information located near the mouse cursor, to indicate the (x, y) value of any point on the graph or other relevant information associated with the point on the graph. An exemplary non-limiting display showing GFI tool tips is illustrated in FIG. 13.

Figure 14:
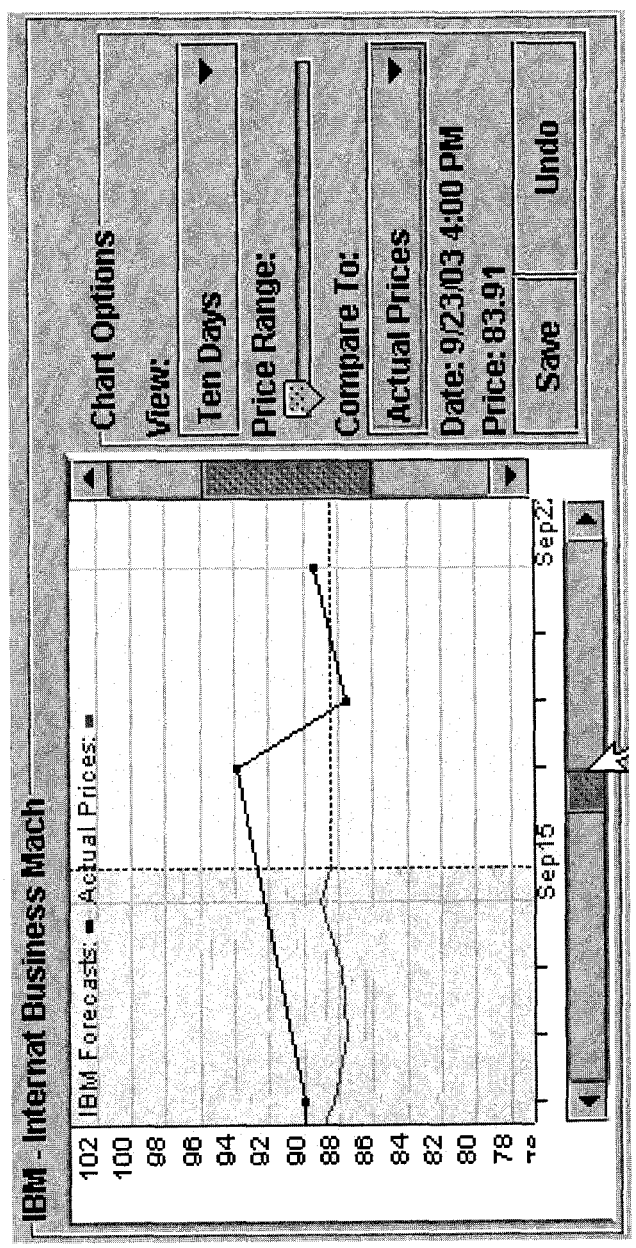
FIG. 14 depicts an exemplary graphical forecasting interface display showing exemplary scrolling features before scrolling.
Figure 15:
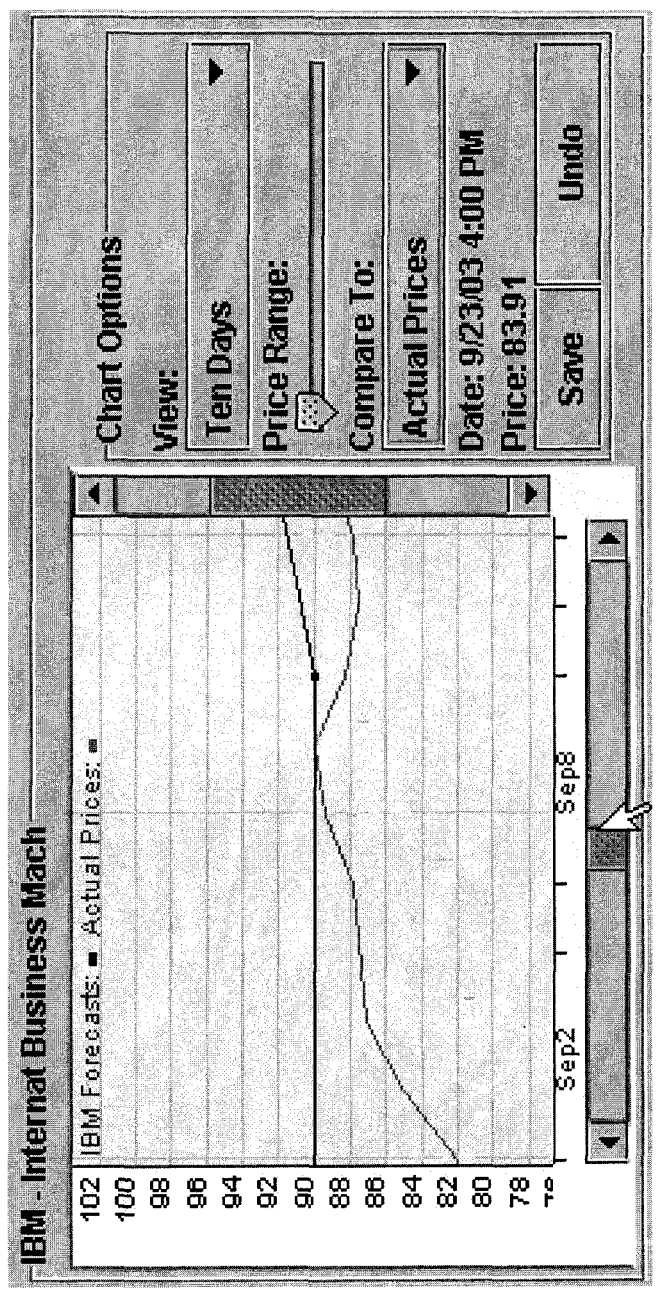
FIG. 15 depicts an exemplary graphical forecasting interface display showing exemplary scrolling features after scrolling.

In one exemplary embodiment, the total graph plane itself may be larger than the graphing area that is visible to the user at any single moment. This allows the users to view the graphing plane in a relatively small space with higher detail. To navigate to different areas of the graph plane, the user may utilize a scrolling feature or tool scroll the graph plane to show different areas or regions of the total graph plane or data set. Exemplary non-limiting displays are shown in FIG. 14 before scrolling and in FIG. 15 after scrolling.

Figure 16:
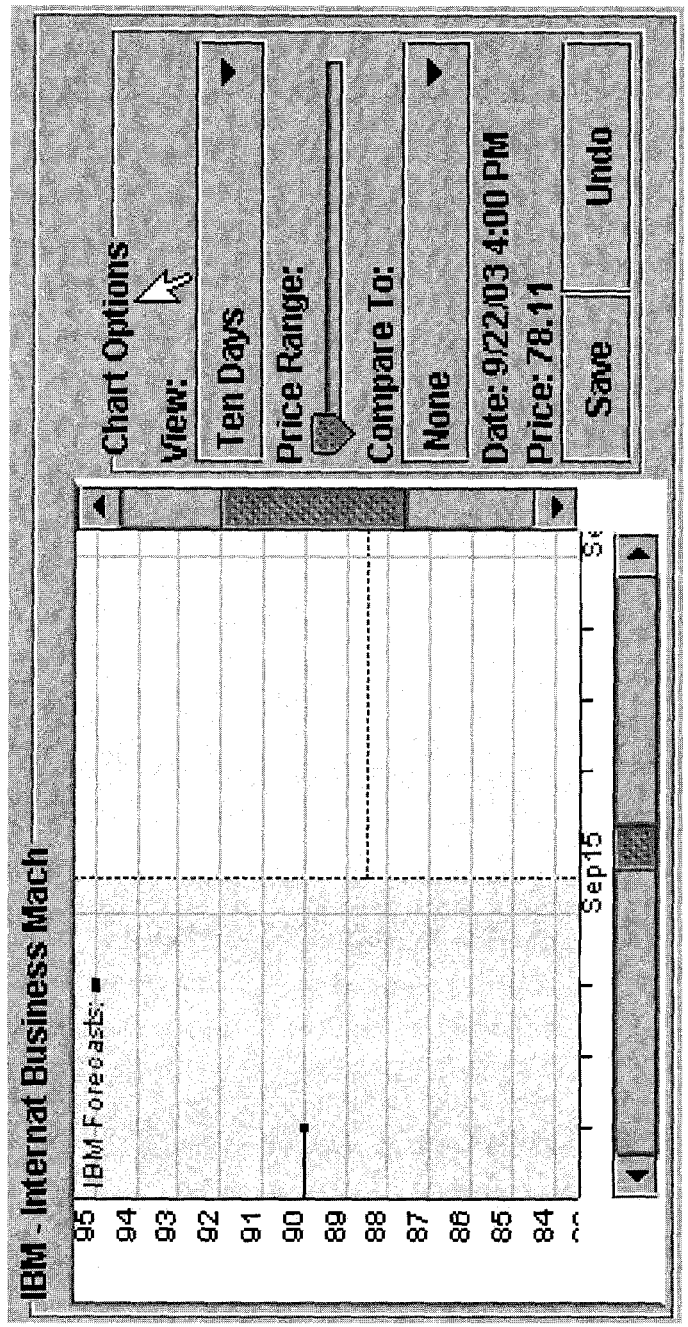
FIG. 16 depicts an exemplary graphical forecasting interface display showing exemplary use of a threshold such as a centered threshold.

In one non-limiting embodiment, if the GFI plots time-based data, the current date/time is advantageously displayed and desirably always centrally located within the graph's x-axis. In other words, the x-value in the center of the graph represents the current date/time. This implies that the left-hand half of the graphical plane represents past dates, while the right-hand half represents future dates. Alternative time ordering schemes may be adopted. The current date/time x-value is advantageously considered and used as a threshold point and when this convention is adopted, the user cannot manipulate any plotted data located to the left of this point (i.e., with an x-value or time coordinate less than the threshold). The user can manipulate data to the right of the threshold point (i.e., with x-values or time value greater than the threshold). The use of a centered threshold is illustrated in FIG. 16.

Figure 17:
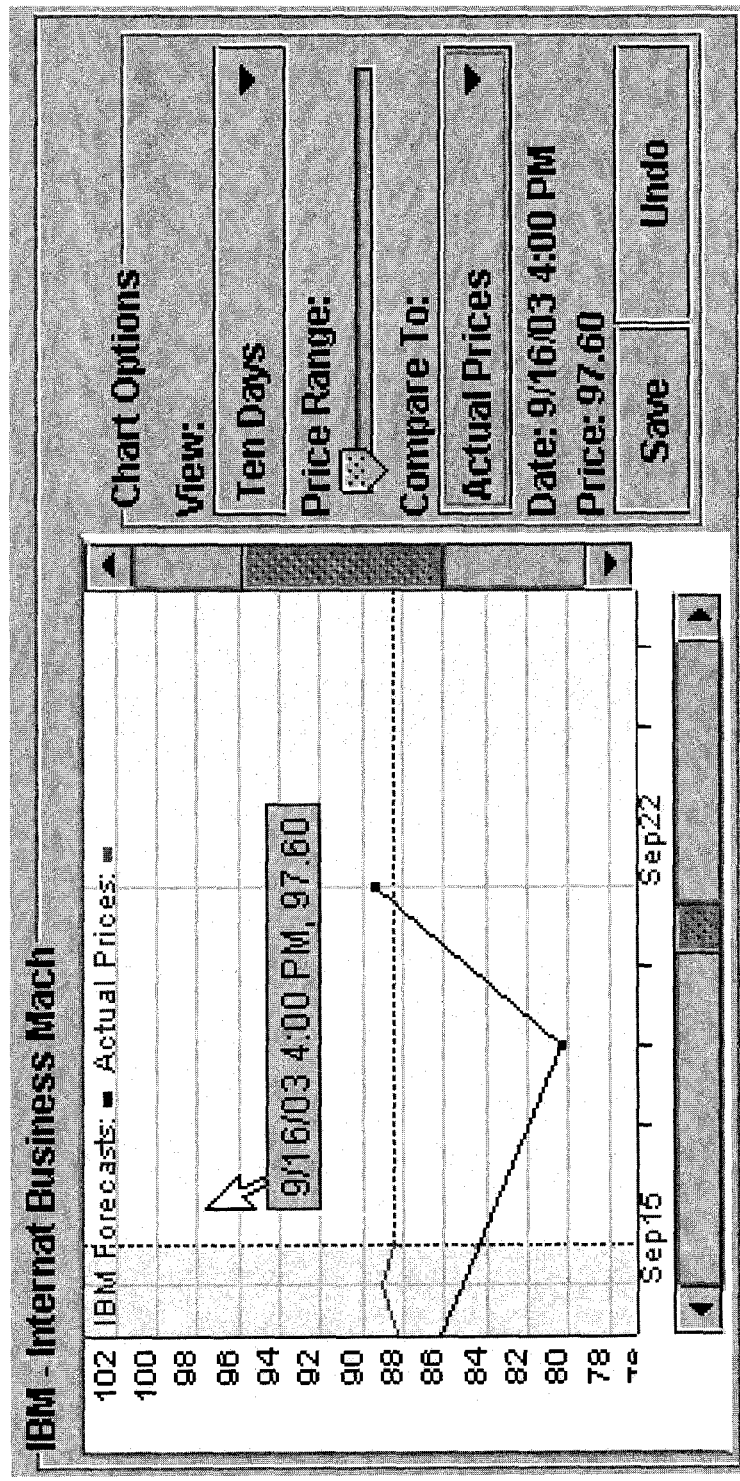
FIG. 17 depicts an exemplary graphical forecasting interface display showing exemplary clicking on a point of the graph to add a data point.
Figure 18:
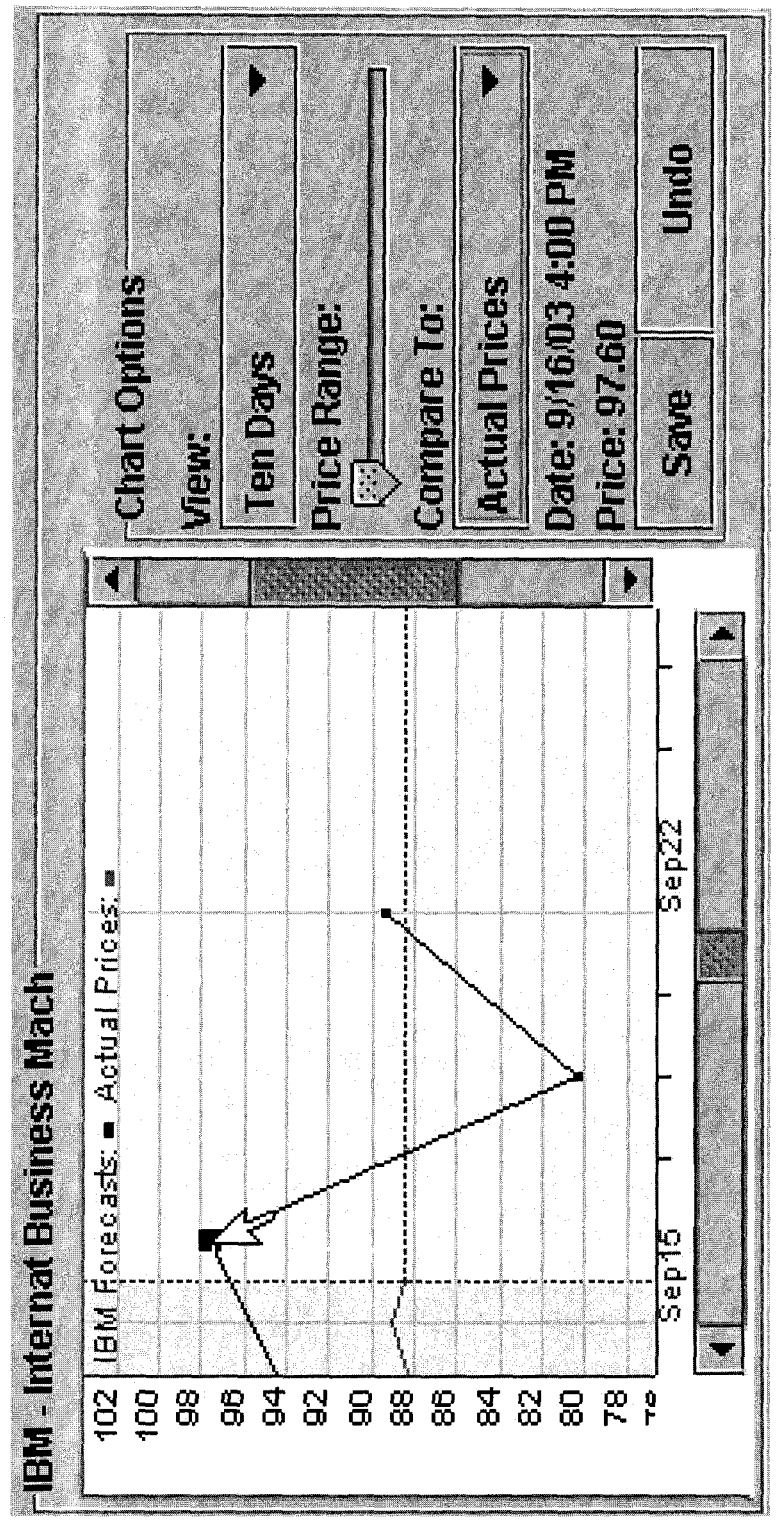
FIG. 18 depicts an exemplary graphical forecasting interface display showing exemplary result of clicking on a point of the graph to add a data point.

In at least one embodiment, the user can click within the graph area to add points; lines are automatically drawn to linearly connect pairs of neighboring points. Curves may be implemented in piecewise linear manner or directly if the user chooses a particular non-linear relationship to connect points, though it will be appreciated that selecting points even if representing a curved trend with linear segments are usually a more intuitive way to inputs prediction or forecasts. As described relative to the centered threshold feature or tool, if a threshold exists, the user cannot add points to the left of the threshold (i.e., the user cannot plot new points for past date/times). FIG. 17 is an illustration of a display graph area before clicking on a point and FIG. 18 is an illustration of the corresponding graph area after the user clicks a point.

Figure 19:
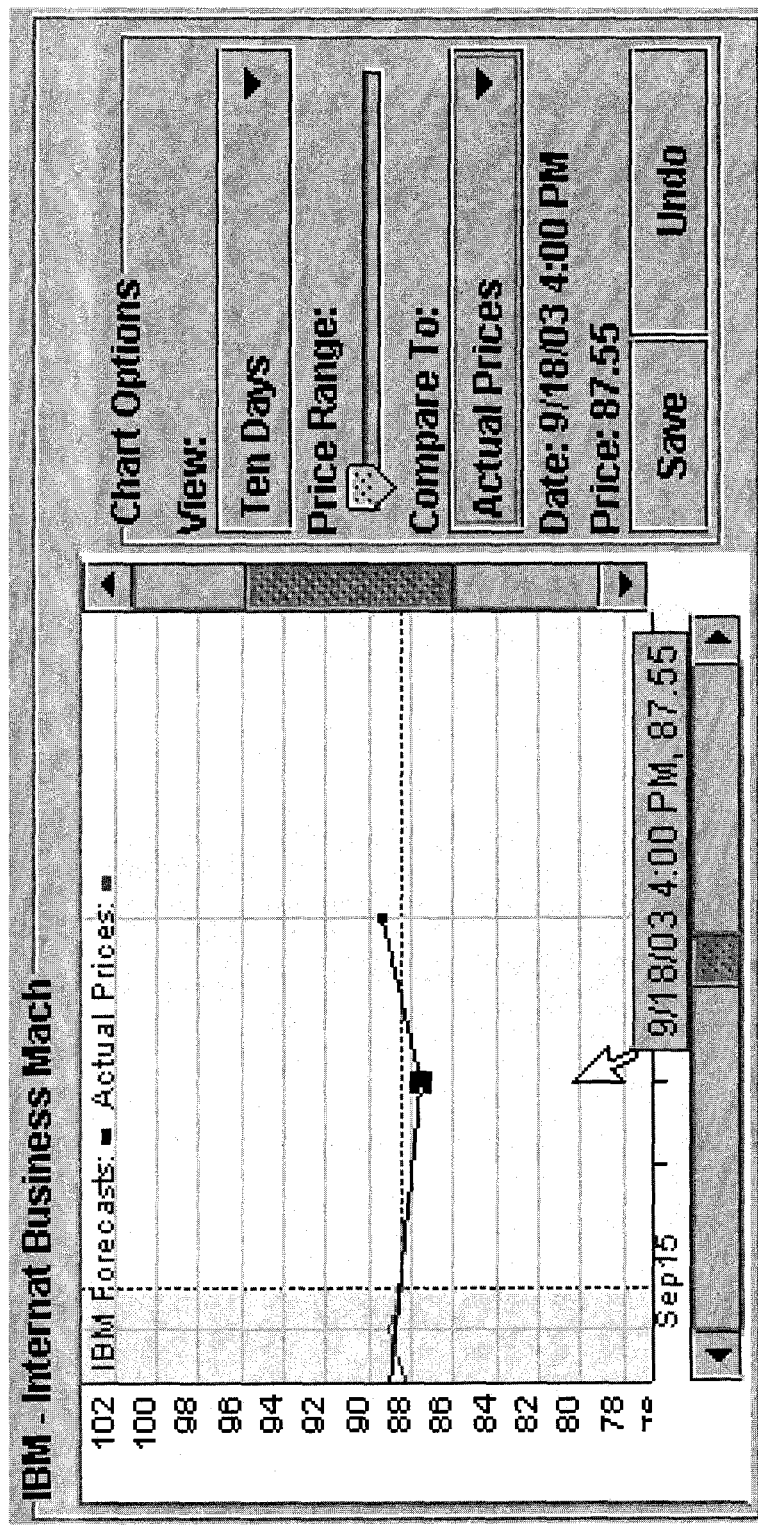
FIG. 19 depicts an exemplary graphical forecasting interface display showing an exemplary graphical display before clicking in occupied x-space.
Figure 20:
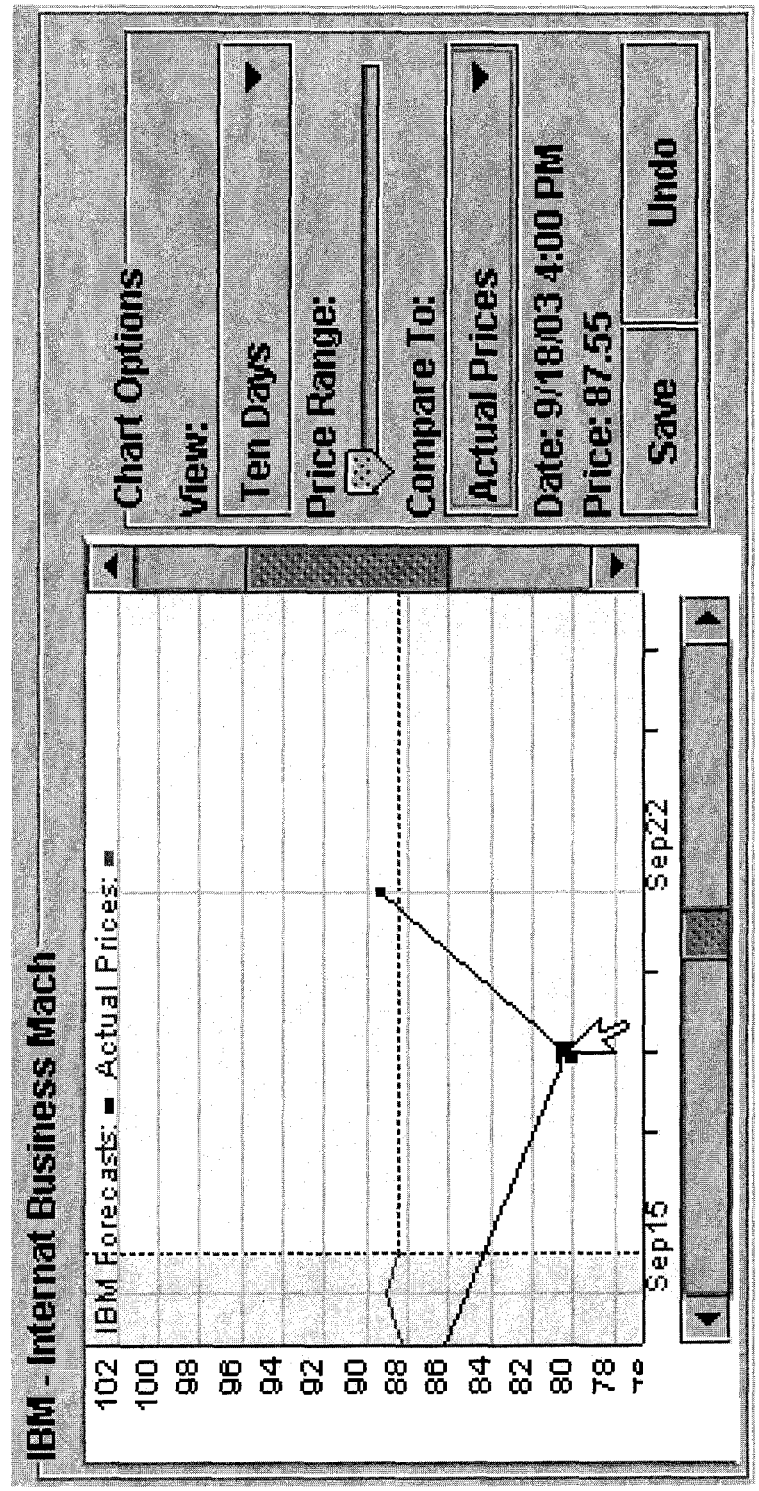
FIG. 20 depicts an exemplary graphical forecasting interface display showing an exemplary graphical display after clicking in occupied x-space.

In one embodiment, the GFI prohibits two points from having the same x value (which may be date/time value). If a user attempts to place a new point at an already occupied x location (e.g., occupied date/time value), the GFI moves the original point from its original y location to the y location of the user's desired new point. FIG. 19 illustrates the appearance of the display before clicking in occupied x-space and FIG. 20 illustrates the appearance of the display after clicking in occupied x-space.

In one embodiment, the user may optionally but advantageously also directly move points within the display. The user can click on a point and, while holding down the mouse button (or using other interactive tools), move the mouse to relocate the point. The user must release the mouse button to place the point at the new location. If a threshold exists, the user can only move points that reside to the right of the threshold (points that represent future dates), and those points can only be moved within the area to the right of the threshold (within the realm of future dates). It will be appreciated that other or alternative combinations of key strokes, mouse buttons, or other interactive tools may be used to implement this functionality. If a user attempts to move a point to a location within the graph plane, but outside the visible graph area (i.e., the user drags a point to a location "off-screen") the GFI may automatically scroll the graph plane to reveal the formerly "off-screen" area.

Figure 21:
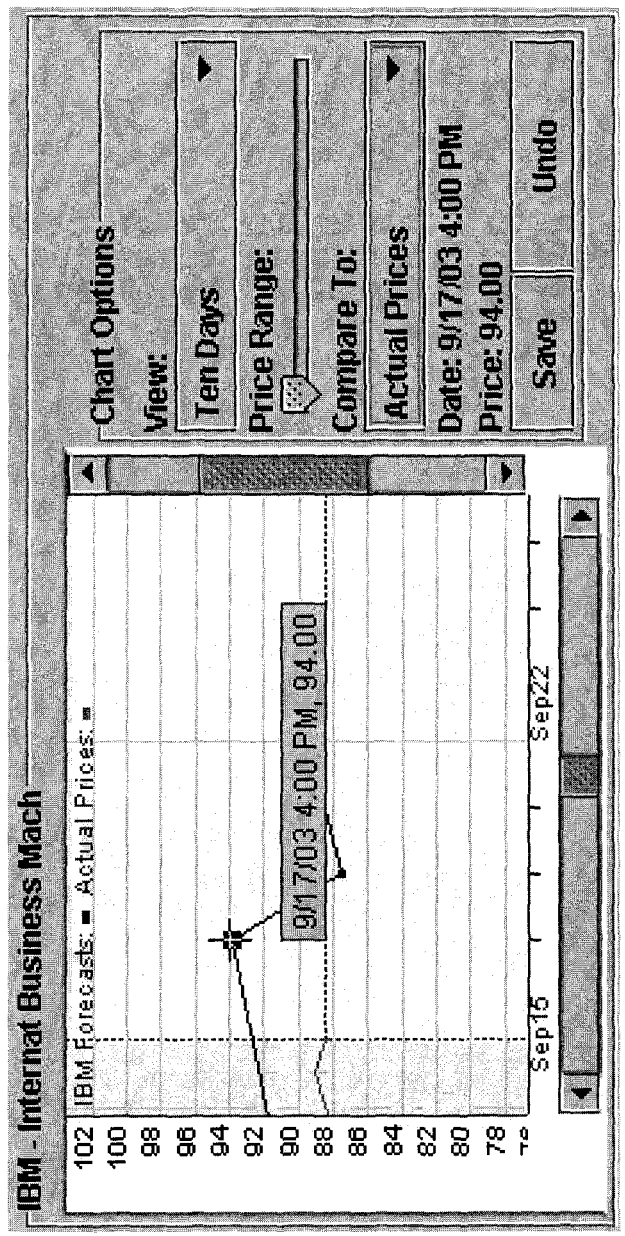
FIG. 21 depicts an exemplary graphical forecasting interface display showing an exemplary graphical display before double-clicking to change the cursor appearance.
Figure 22:
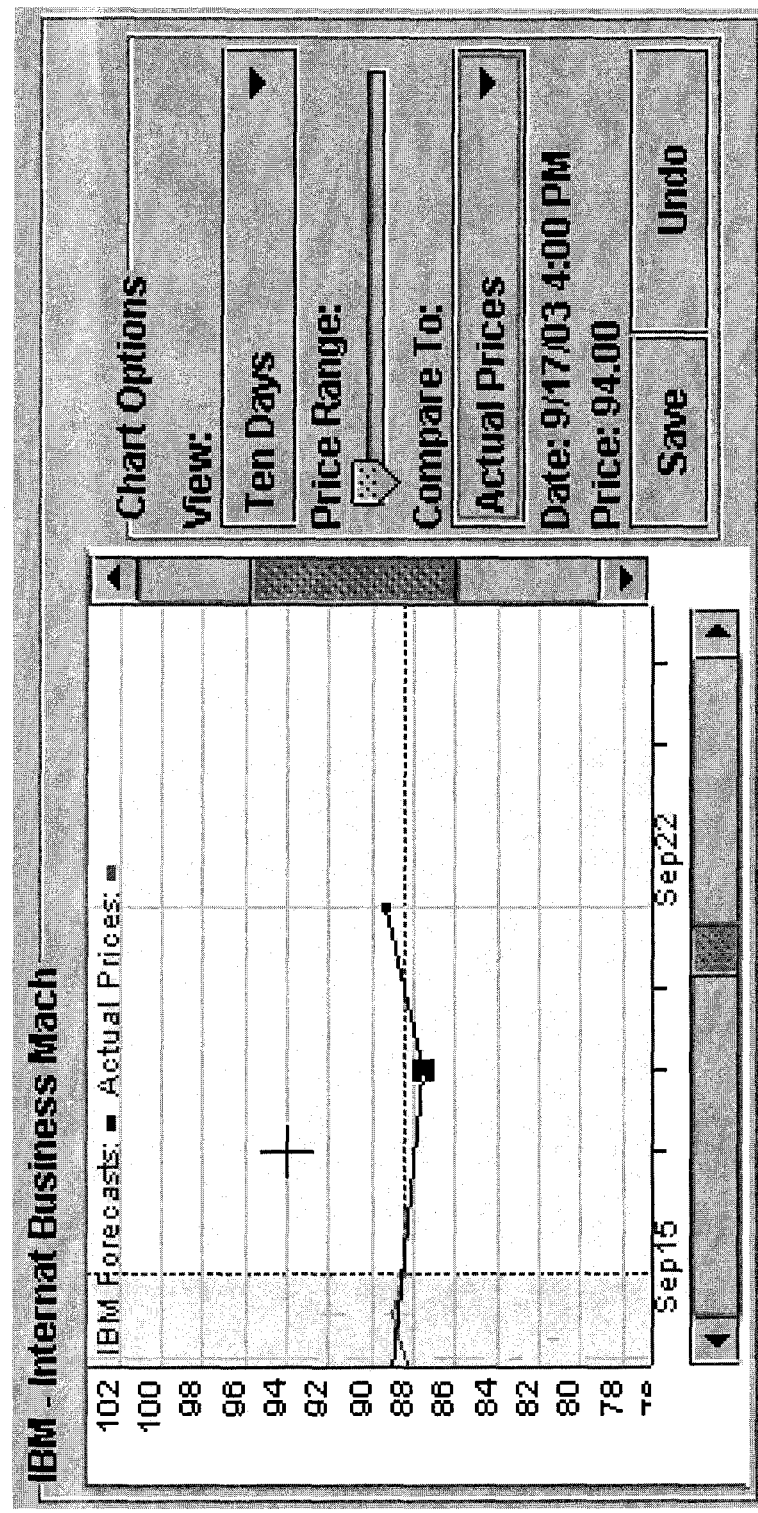
FIG. 22 depicts an exemplary graphical forecasting interface display showing an exemplary graphical display after double-clicking to change the cursor appearance.

In one embodiment, when the user hovers the mouse cursor over an editable point, the mouse cursor changes from the default (pointer) cursor into a crosshair cursor or cursor of other differentiable shape or appearance. The user can remove the hovered point by double-clicking the mouse button. If a threshold exists, the user cannot remove points to the left of the threshold (points representing past date/times). FIG. 21 illustrates the appearance before the change by double clicking and FIG. 22 illustrates the appearance after double clicking or other action to change cursor shape or appearance.

If the user has added, edited, or deleted points to the graph, the user can save these points by pressing the Save button or other interaction to save the added, modified, edited, or deleted points.

In one embodiment, if a user has added, edited, and/or deleted points, the user can sequentially undo his additions or edits in reverse chronological order by clicking the Undo button. Various other options may also be provided to selectively retain or undue edits in a selected order or over a particular date, time, value range or according to other criteria.

Using the systems and/or methods depicted in the above examples, a user can easily and quickly provide a forecast and receive feedback from other users. For example, the user can observe the past record of a football team and predict whether the football team is going to win the next game. The user can also receive feedback from other users predicting whether the football team is going to win or lose. These characteristics of the systems and/or methods are extremely beneficial in gathering and providing information to the user.

Embodiments of the invention further includes a business method or method of doing business wherein a user may provide predictions or forecasts and receive forecasts, predictions, or other data from other users either for a subscription fee or payment or in exchange for their own predictions and forecasts. Advertising fees may also or alternatively be collected from non-users in connection with the graphical forecasting interface.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A graphical forecasting interface for execution in a processor, the graphical forecasting interface comprising:
   a graph module for executing in the processor and having an interactive graphical interface input portion configured for receiving new data inputs for future forecast data entered into a database, and after input then for plotting as an output the future forecast data;
   a submission module for executing in the processor configured for sending the future forecast data points to a database for storage;
   a retrieval module executing in the processor configured for retrieving the future forecast data points from the database;
   a calculation module for executing in the processor and configured for performing a desired function on the retrieved future forecast data points to generate a desired result; and
   a display module for executing in the processor configured for displaying the desired result as at least one plot using the graph module.

2. A graphical forecasting interface as recited in claim 1, wherein the graph module further includes a static portion containing a plot of past data points.

3. A graphical forecasting interface as recited in claim 1, wherein the new data inputs for future forecast data is captured as one or more values from the graph and then stored in the database on a remote server and contains future forecast data from a plurality of users.

4. A graphical forecasting interface as recited in claim 1, wherein the new data inputs for future forecast data is captured as one or more values from the graph and then stored on a local server and contains future forecast data from a plurality of users.

5. A graphical forecasting interface as recited in claim 3, wherein the desired function is selected as one or a combination of a statistical or mathematical function or calculation or transformation of the future forecast data from the plurality of users.

6. A graphical forecasting interface as recited in claim 5, wherein the statistical or mathematical function or calculation or transformation of the future forecast data from the plurality of users comprises one of an average, a weighted average, and a weighted consensus, wherein different weights are applied to different user forecasts based on some weighting criteria.

7. A graphical forecasting interface as recited in claim 6, wherein the weighting criteria are determined based on at least one of past forecasting accuracy, categorization of the user making the forecast as an expert or as a novice, or on a combination of these.

8. A graphical forecasting interface as recited in claim 1, wherein the graph module, submission module, retrieval module, calculation module and display module are integrated into one module.

9. A graphical forecasting interface as recited in claim 1, wherein the new data inputs for future forecast data are received from a user by drawing a line, or clicking a mouse, making a touch-screen or touch pad or pen input, or making another graphical interaction using a pointing device, key stroke, voice input, or other interaction on the interactive portion of the graph module: and
   the interactive graphical interface receives an input new data point in a region of the space allocated for the graph where there is no existing data and generates at least one new data input for future forecast data for storage into the database.

10. A graphical forecasting interface as recited in claim 1, further comprising:
   a receiving module;
   wherein a user enters future forecast data into the receiving module and the receiving module receives the entered future forecast data and plots the future forecast data on the interactive portion of the graph module.

11. A graphical forecasting interface as recited in claim 1, wherein the graph module is used to gather and predict a future data item.

12. A graphical forecasting interface as recited in claim 1, wherein the graph module is used to gather and predict future forecast financial data.

13. A graphical forecasting interface as recited in claim 12, wherein the future forecast financial data includes at least one selected from the group comprising: a market index, a group of stocks, a stock index, a stock price, a mutual fund price, a currency price, a bond price, a bond rating, a credit rating, an Exchange Traded Fund, an index, and any combination of these.

14. A graphical forecasting interface as recited in claim 1, wherein the graph module is used to gather and predict at least one future forecast selected from the group consisting of a commodity, an article of trade, a sport outcome, a numerical outcome, a financial outcome, and a weather event.

15. A computer implemented method of gathering information from a user and predicting a future outcome, the computer implemented method comprising the steps of:
   receiving a new data input for future forecast data via an interactive graphical interface input portion of the graph;
   sending the future forecast data to a memory device for storage;
   retrieving the stored future forecast data from the memory device;
   processing in a processor the future forecast data to generate a desired future prediction result; and
   displaying the desired future prediction result on the interactive portion of the graph.

16. A method as recited in claim 15, wherein the graph further having a static portion.

17. A method as recited in claim 16, wherein the static portion of the graph corresponds to previous events and the interactive portion of the graph corresponds to future events.

18. A method as recited in claim 17, wherein processing the future forecast data involves applying one or a combination of a statistical or mathematical function or calculation or transformation of the of the future forecast data and the desired future prediction result is a result of applying the statistical or mathematical function or calculation or transformation.

19. A method as recited in claim 17, wherein processing the future forecast data involves taking an average or a weighted average with non-uniform weights of the future forecast data and the desired information is a result of the average or weighted average.

20. A method as recited in claim 15, wherein the memory device is located remotely.

21. A method as recited in claim 15, wherein the step of receiving the new data input for future forecast data further comprises the steps of:
   analyzing one or more of: a line drawn interactively by a user, a user mouse click, a user touch-screen or touch pad or pen input, or another user input graphical interaction using a pointing device, key stroke, voice input, or other interaction on or relative to the interactive portion of the graph to determine the user input; and
   the interface receives a new data input for future forecast data in a region of the space allocated for the graph where there is no existing information and generates at least one new input for future forecast data for storage into the database.

22. A method as recited in claim 15, wherein the step of receiving a new data input for future forecast data further comprises the steps of:
   receiving the new data input for future forecast data and plotting the data on the interactive portion of the graph to determine the user input.

23. A method as recited in claim 15, wherein the graph further having a static portion, and the static portion of the graph displays previous financial data, the user input is the user's prediction of future financial data, and the desired information is a statistical or mathematical function or calculation or transformation of all of a plurality of user's predictions for the financial data.

24. A method as recited in claim 15, wherein the financial data comprises a stock or bond price or value.

25. A method as recited in claim 15, wherein the graph further having a static portion, and the static portion of the graph displays past state information for a particular item or set of items, the user input is the user's prediction of future state information for the particular item or set of items, and the desired information is generated by applying one or a combination of a statistical or mathematical function or calculation or transformation of the of the information, and the desired information is a result of applying a statistical or mathematical function or calculation or transformation to a plurality of all user's future forecast predictions for the information for a particular item or set of items.

26. A method as recited in claim 15, wherein the graph module is used to gather and predict a future data item.

27. A method as recited in claim 15, wherein the graph module is used to gather and predict future financial data.

28. A tangible non-transitory computer-readable storage medium storing program code for performing in a processor of a computer the steps comprising:
   receiving a new data input for future forecast data via an interactive graphical interface input portion of the graph;
   sending the future forecast data to a memory device for storage;
   retrieving the stored future forecast data, from the memory device;
   processing in a processor the future forecast data to generate a desired future prediction result; and
   displaying the desired future prediction result on the interactive portion of the graph.

29. A tangible non-transitory computer-readable storage medium as recited in claim 28, wherein the graph further includes a static portion that corresponds to previous events and the interactive portion of the graph corresponds to future events.

30. A tangible non-transitory computer-readable storage medium as recited in claim 29, wherein the desired information is an average of data stored in the database and the data stored in the database comprises the user input future forecast data and input future forecast data from previous users.

31. An apparatus comprising:
   a graphical engine for executing within a processor with an interactive portion for accepting a new data input for future forecast data for an information item and for then calculating and then displaying a statistical or mathematical function or calculation or transformation of the new data input for future forecast data and a previous user prediction for that same information item;
   input means for receiving new data which is then re-displayed in the context of other preexisting information;
   the graphical engine further including:
   a graph engine module for executing in the processor and having an interactive graphical interface input data generating portion configured for generating a new future forecast data and then storing the generated new future forecast data into a database, and a graphical plotting portion for plotting as an output the generated new future forecast data points.

32. The apparatus as recited in claim 31, further comprising: a static portion for displaying past state of the information item.

33. The apparatus as recited in claim 32, wherein the information item comprises financial information.

34. The apparatus as recited in claim 33, wherein the financial information comprises a stock or bond price.

35. The apparatus as recited in claim 33, further comprising: a database for storing user future forecast data predictions and for using user future forecast data predictions to calculate an average or consensus of future forecast data predictions.

36. A graphical forecasting interface as recited in claim 12, wherein the predicted future forecast financial data comprises at least one of: a predicted future market index, a predicted future financial data for a group of stocks, a predicted future stock index, a predicted future stock price, a predicted future mutual fund price, a predicted future currency price, a predicted future bond price, a predicted future bond rating, a predicted future credit rating, a predicted future Exchange Traded Fund financial data, and a predicted future index financial data or value.

37. A graphical forecasting interface as recited in claim 1, wherein one of the graph module and the calculation module or both modules operable to generate a plurality of new data inputs for future forecast data based on a single new data input for future forecast data received from a user.

38. A graphical forecasting interface as recited in claim 1, wherein one of the graph module and the calculation module or both modules operable to generate a first plurality of new data inputs for future forecast data based on a second plurality of new data inputs for future forecast data received from a user, wherein the number of the first plurality is greater than the number of the second plurality.

39. A graphical forecasting interface as recited in claim 38, wherein the first plurality of new data inputs for future forecast data comprises a plurality of new data inputs for future forecast data along a line or a curve that are interpolated between two points on the graph that define the second plurality.

40. A computer implemented method as in claim 15, further comprising:

generating a first plurality of new data inputs for future forecast data based on a second plurality of new data inputs for future forecast data received from a user, wherein the number of the first plurality is greater than the number of the second plurality.

41. A computer implemented method as in claim 40, wherein the first plurality of new data inputs for future forecast data comprises a plurality of new data inputs for future forecast data along a line or a curve that are interpolated between two points on the graph that define the second plurality.

* * * * *